United States Patent
Watabe et al.

(10) Patent No.: US 11,951,984 B2
(45) Date of Patent: Apr. 9, 2024

(54) OPEN VEHICLE AND OPERATION MANAGEMENT SYSTEM THEREOF

(71) Applicant: TOYOTA JIDOSHA KABUSHIKI KAISHA, Toyota (JP)

(72) Inventors: Takuya Watabe, Hachioji (JP); Tetsuya Kanata, Susono (JP); Yozo Iwami, Susono (JP); Daisaku Honda, Nagoya (JP); Yuhei Katsumata, Fuji (JP); Hideki Fukudome, Toyota (JP); Yuta Maniwa, Susono (JP); Naoko Ichikawa, Shibuya-ku Tokyo-to (JP); Saki Narita, Toyota (JP); Yuki Nishikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 367 days.

(21) Appl. No.: 17/473,070

(22) Filed: Sep. 13, 2021

(65) Prior Publication Data
US 2022/0080965 A1    Mar. 17, 2022

(30) Foreign Application Priority Data

Sep. 15, 2020   (JP) ................................ 2020-154776

(51) Int. Cl.
*B60W 30/14* (2006.01)
*B60Q 5/00* (2006.01)
(Continued)

(52) U.S. Cl.
CPC ............. *B60W 30/143* (2013.01); *B60Q 5/00* (2013.01); *B60W 60/00136* (2020.02);
(Continued)

(58) Field of Classification Search
None
See application file for complete search history.

(56) References Cited

U.S. PATENT DOCUMENTS 10,418,019 B1 *   9/2019   Murad ............... G10K 11/1754
2017/0327082 A1 * 11/2017  Kamhi ............... B60H 1/00357
(Continued)

FOREIGN PATENT DOCUMENTS

| CN | 205706411 U | 11/2016 |
|----|-------------|---------|
| CN | 109878512 A | 6/2019  |
| JP | 2004-34756 A | 2/2004 |

*Primary Examiner* — Hunter B Lonsberry
*Assistant Examiner* — Paysun Wu
(74) *Attorney, Agent, or Firm* — Dinsmore & Shohl LLP

(57) ABSTRACT

An open vehicle includes a vehicle upper portion, a traveling device, an external sensor, and an ECU. The vehicle upper portion has a riding surface that forms a bottom surface of the riding space and is configured for a plurality of users to ride on. The ECU is configured to control the traveling device to cause the open vehicle to automatically travel. The ECU is configured to execute: a specific person recognition process to use the external sensor to recognize a specific person existing in an outside space; and an automatic travel control process to control the traveling device such that, when the specific person exists within a predetermined distance range, the traveling device executes at least one of moving the open vehicle away from the specific person and increasing a vehicle speed as compared to when the specific person does not exist within the range.

16 Claims, 19 Drawing Sheets

(51) Int. Cl.
*B60W 60/00* (2020.01)
*G06Q 10/02* (2012.01)
*G06Q 10/1093* (2023.01)
*G06Q 50/40* (2024.01)
*G06V 20/56* (2022.01)
*G06V 40/16* (2022.01)
*H04W 4/40* (2018.01)

(52) U.S. Cl.
CPC .. *B60W 60/0021* (2020.02); *B60W 60/00253* (2020.02); *G06Q 10/02* (2013.01); *G06Q 10/1095* (2013.01); *G06Q 50/40* (2024.01); *G06V 20/56* (2022.01); *G06V 40/172* (2022.01); *H04W 4/40* (2018.02); *B60W 2540/21* (2020.02); *B60W 2556/45* (2020.02)

(56) References Cited

U.S. PATENT DOCUMENTS

| | | | |
|---|---|---|---|
| 2020/0184748 A1* | 6/2020 | Mangal | H04W 12/69 |
| 2020/0225670 A1 | 7/2020 | Jankovic et al. | |
| 2020/0238837 A1 | 7/2020 | Miyaki et al. | |

* cited by examiner

OPEN VEHICLE AND OPERATION MANAGEMENT SYSTEM THEREOF

CROSS-REFERENCE TO RELATED APPLICATION

The present disclosure claims priority under 35 U.S.C. § 119 to Japanese Patent Application No. 2020-154776, filed on Sep. 15, 2020, which is incorporated herein by reference in its entirety.

BACKGROUND

Technical Field

The present disclosure relates to an open vehicle having a riding space that is not shielded from the outside, and a management system thereof.

Background Art

For example, JP 2004-034756 A discloses an automobile which can be used as a mobile office equipped with a conference desk and office equipment in a vehicle cabin. Generally, an automobile has both a fixed or movable roof and windows, and is configured such that the interior of the automobile can be shielded from the surroundings.

SUMMARY

In an open vehicle in which the riding space is not shielded from the surroundings, conversations in the riding space may be heard by people outside the vehicle. In this regard, if it is possible to make it difficult for people outside the open vehicle to heard conversations in the riding space by using automatic travel control, the privacy of conversations of users can be protected and the convenience of this kind of open vehicle can be improved.

The present disclosure has been made in view of the problem described above, and an object of the present disclosure is to provide an open vehicle with automatic travel control that can make it difficult for people outside the open vehicle to hear conversations in the riding space.

An open vehicle according to the present disclosure has a riding space that is not shielded from an outside, and includes a vehicle upper portion, a traveling device, one or more external sensors, and one or more electronic control units. The vehicle upper portion has a riding surface, and the riding surface forms a bottom surface of the riding space and is configured for a plurality of users to ride on. The traveling device includes at least a power unit and is configured to drive and turn the open vehicle. The one or more external sensors are configured to recognize a surrounding environment of the open vehicle. The one or more electronic control units are configured to control the traveling device to cause the open vehicle to automatically travel. The one or more electronic control units are configured to execute: a specific person recognition process to use the one or more external sensors to recognize a specific person being a person existing in an outside space that is not shielded from the riding space; and an automatic travel control process to control the traveling device such that, when the specific person exists within a range of a predetermined distance from the open vehicle, the traveling device executes at least one of moving the open vehicle away from the specific person and increasing a vehicle speed being a speed of the open vehicle as compared to when the specific person does not exist within the range.

The one or more electronic control units may be configured to receive a destination of the open vehicle and a mobile meeting request for the plurality of users to hold a mobile meeting on the open vehicle, and then execute a meeting traveling mode until the open vehicle reaches the destination. The specific person recognition process and the automatic travel control process may be executed in the meeting traveling mode.

The one or more electronic control units may be configured to receive a mobile meeting request for a plurality of users to hold a mobile meeting on the open vehicle and a scheduled time for the mobile meeting, and then execute a meeting traveling mode without a destination until the scheduled time elapses. The specific person recognition process and the automatic travel control process may be executed in the meeting traveling mode.

After the scheduled time elapses, the one or more electronic control units may be configured to execute a return mode that controls the traveling device such that the open vehicle returns to a starting location of the meeting traveling mode.

In the automatic travel control process, the one or more electronic control units may be configured to lengthen the predetermined distance when the vehicle speed is low than when the vehicle speed is high.

The open vehicle may further includes a microphone. In the automatic travel control process, the one or more electronic control units may be configured to lengthen the predetermined distance when a voice volume of conversation of the plurality of users in the riding space is large than when the voice volume is small.

The open vehicle may further include a microphone. In the automatic travel control process, the one or more electronic control units may be configured to increase the vehicle speed when a voice volume of conversation of the plurality of users in the riding space is large than when the voice volume is small.

In the automatic travel control process, the one or more electronic control units may be configured to receive information indicating a confidentiality level of conversation of the plurality of users in the riding space and lengthen the predetermined distance when the confidentiality level is high than when the confidentiality level is low.

In the automatic travel control process, the one or more electronic control units may be configured to receive information indicating a confidentiality level of conversation of the plurality of users in the riding space and increase the vehicle speed when the confidentiality level is high than when the confidentiality level is low.

In the automatic travel control process, the one or more electronic control units may be configured to increase the vehicle speed when the traveling device cannot be controlled so as to move the open vehicle away from the specific person as compared to when the specific person does not exist within the range.

The open vehicle may further include a speaker configured to emit sound toward the outside space. The one or more electronic control units may be configured to operate the speaker when the specific person exists within the range.

In the automatic travel control process, the one or more electronic control units may be configured not to execute at least one of moving the open vehicle away from the specific person and increasing the vehicle speed when a relative speed of the open vehicle with respect to the specific person is higher than a threshold value.

An operation management system according to the present disclosure includes at least one open vehicle according to the present disclosure together with a mobile terminal and a management server. The mobile terminal is owned by at least one of the plurality of users. The management server includes a processor and is configured to communicate with the at least one open vehicle and the mobile terminal via a wireless communication network. The processor is programmed to receive, from the mobile terminal, vehicle dispatch reservation information including at least a dispatch location of the open vehicle, and dispatch the open vehicle to a received dispatch location.

According to the open vehicle of the present disclosure, the automatic travel control process is executed to control the traveling device such that, when a specific person exists within the range of the predetermined distance from the open vehicle, the traveling device executes at least one of moving the open vehicle away from the specific person and increasing the vehicle speed as compared to when the specific person does not exist within the range. As a result, it is possible to realize automatic traveling control that can make it difficult for people outside the vehicle to hear the conversation in the riding space.

DETAILED DESCRIPTION

Figure 1:
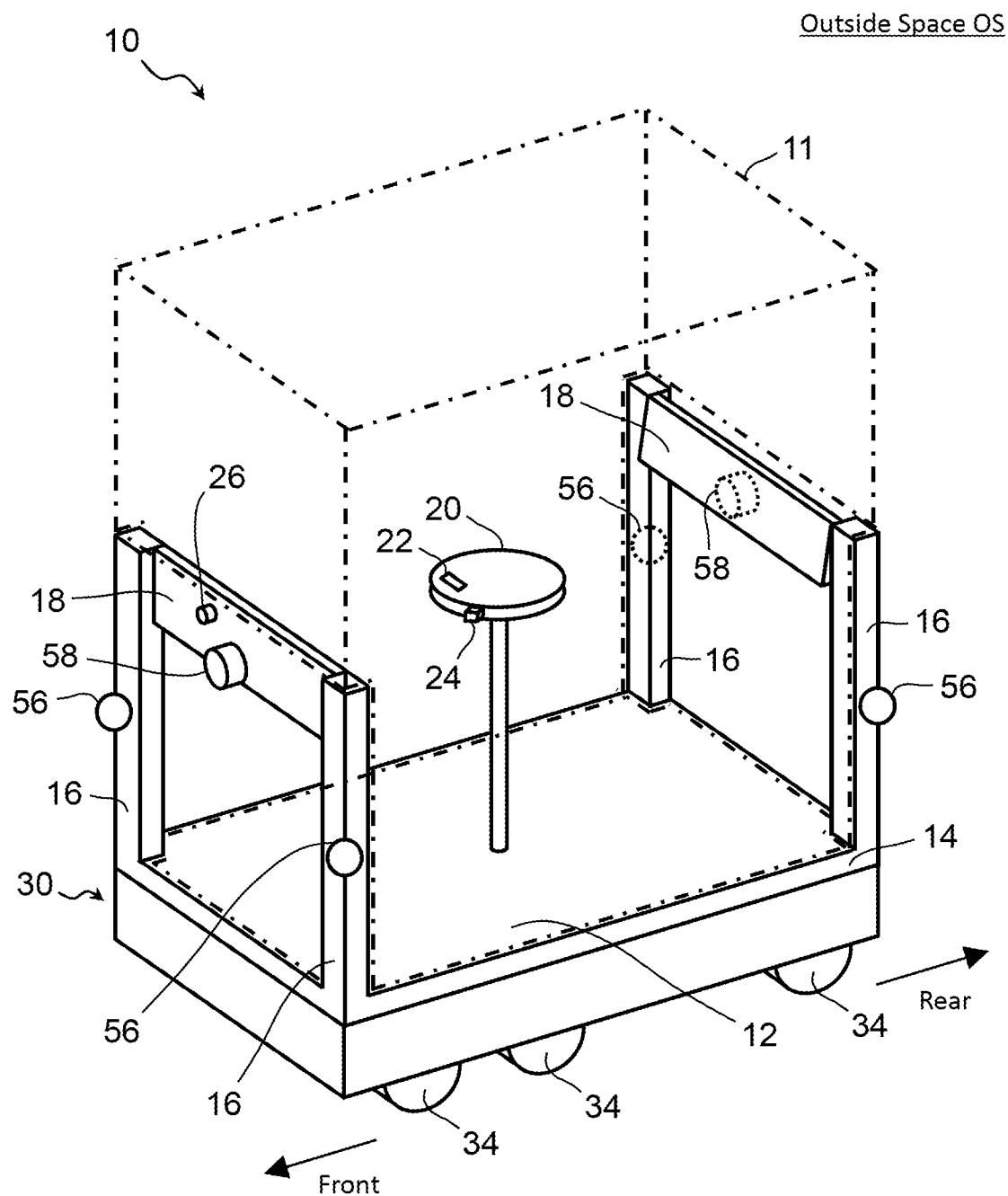
FIG. 1 is a perspective view of an open vehicle according to a first embodiment.

In the following embodiments of the present disclosure, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically.

1. First Embodiment 1-1. Example of Configuration of Open Vehicle

Figure 2:
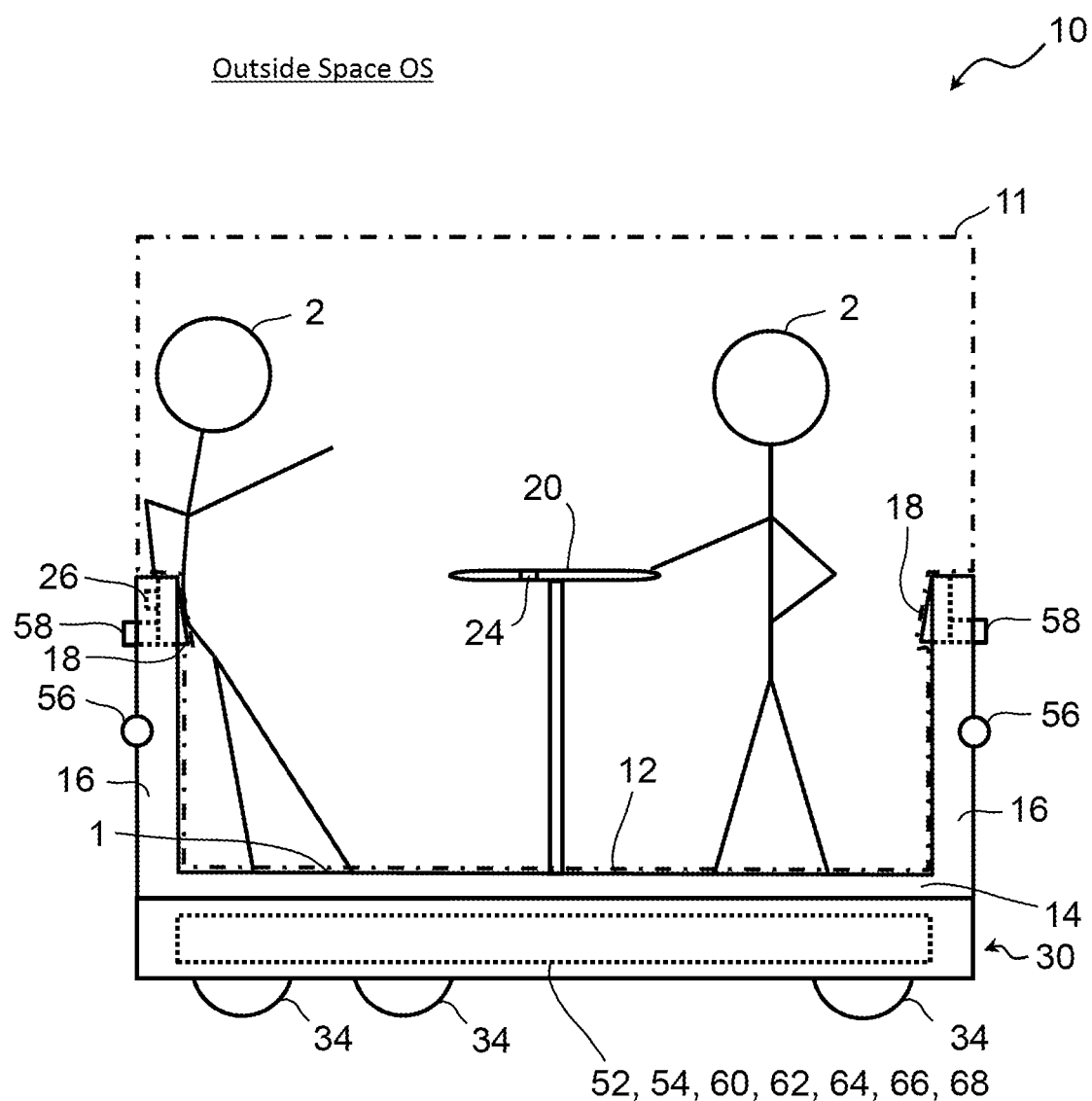
FIG. 2 is a side view of the open vehicle shown in FIG. 1.
Figure 3:
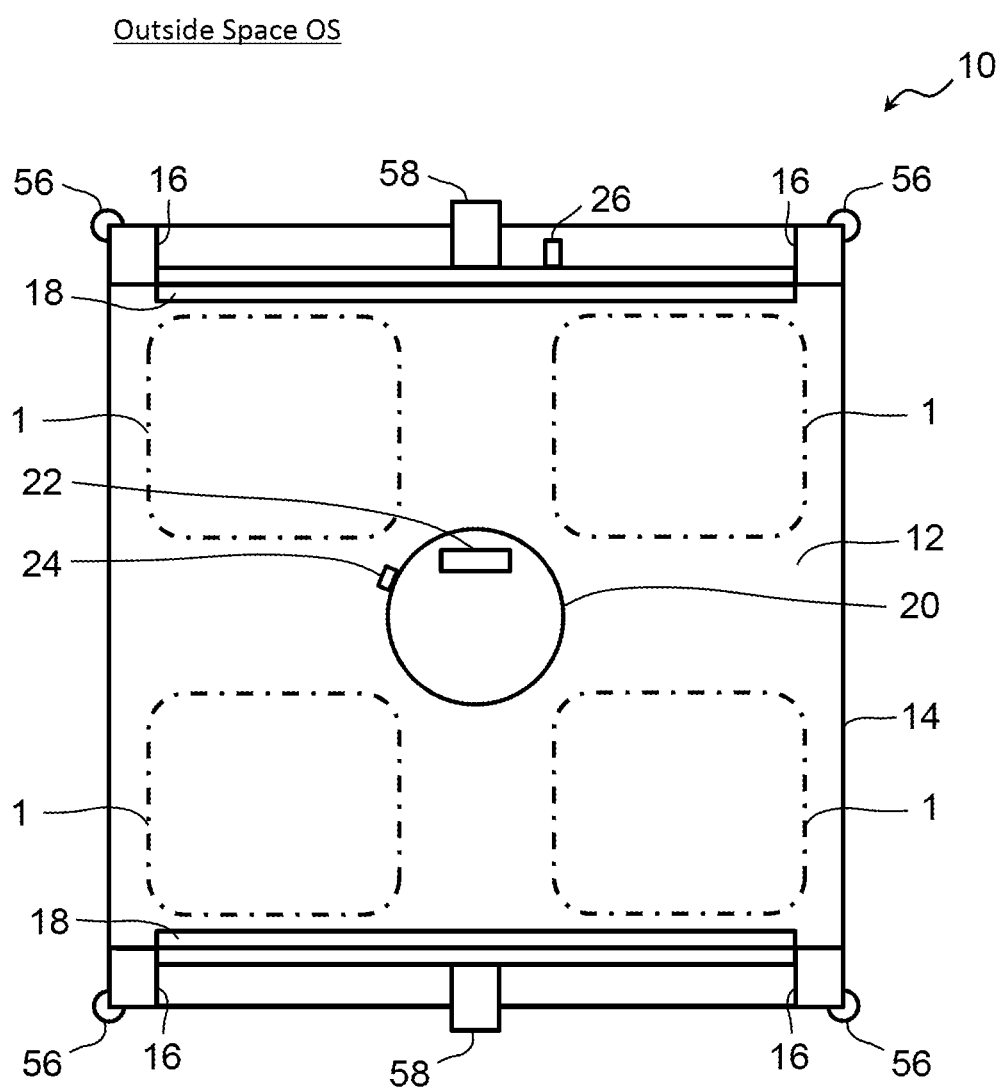
FIG. 3 is a plan view of the open vehicle shown in FIG. 1.

FIG. 1 is a perspective view of an open vehicle 10 according to a first embodiment. FIGS. 2 and 3 are a side view and a plan view of the open vehicle 10 shown in FIG. 1, respectively.

The open vehicle 10 has a riding space 11 that is not shielded from the outside (more specifically, the outside of the vehicle 11). The open vehicle 10 is provided with a top plate 14 having a riding surface (deck) 12 configured for to a plurality of users ride on. The top plate 14 forms an upper portion of the vehicle 10, which corresponds to an example of the "vehicle upper portion" according to the present disclosure. The riding surface 12 is an upper surface of the top plate 14 and forms a bottom surface of the riding space 11.

As shown in FIG. 2, the open vehicle 10 is a stand-up vehicle on which one or more users ride while standing on the riding surface 12, as an example. However, the "open vehicle" according to the present disclosure is not limited to a stand-up vehicle as long as it has a riding space that is not shielded from the outside, and may include seats for a plurality of users, for example.

Moreover, the open vehicle 10 (hereinafter, simply referred to as a "vehicle 10") is configured to automatically travel as described below in detail, and a type of automatic traveling vehicle that can be driven unmanned. More specifically, the open vehicle 10 carries people who ride on the top plate 14. The riding capacity of this kind of open vehicle is not particularly limited as long as it is two or more people, but the riding capacity of the vehicle 10 according to the first embodiment is, for example, four persons as shown as an assumed riding position 1 in FIG. 3. In other words, the vehicle 10 is a small open vehicle (cart).

In the vehicle 10, the configuration of the riding space 11 positioned on the riding surface 12 of the top plate 14 can be freely selected. FIGS. 1 to 3 illustrate an example of the configuration. A support 16 is provided at each of the four corners of the riding surface 12. Each support 16 stands upright from the riding surface 12. The support 16 may be formed integrally with the top plate 14 or may be formed separately from the top plate 14.

The vehicle 10 is provided with a backrest 18 at both the front end and the rear end. The backrest 18 is formed so as to connect the tips of the two supports 16 at each of the front end portion and the rear end portion of the vehicle 10. As illustrated in FIG. 2, one or more users of the vehicle 10 can also be in a position to stand while leaning against the backrest 18 while riding. In addition, a table 20 convenient for the user is attached to the center of the riding surface 12.

Moreover, the vehicle 10 includes an input device 22, a microphone 24, and a speaker 26. The input device 22 is an HMI (Human Machine Interface) such as a touch panel, and is installed on, for example, the upper surface of the table 20. The input device 22 can be used by a user to transmit a "mobile meeting request" described below to the vehicle 10, or to input a "confidentiality level LV of conversation" in examples shown in FIGS. 15 and 21. The microphone 24 is installed on, for example, the table 20 to pick up the voice in the riding space 11, and is used in examples shown in FIGS. 14 and 20 described below. The speaker 26 is provided on, for example, the backrest 18 on the front side in order to emit sound toward the periphery of the riding space 11 ("outside space OS" described below). The speaker 26 is used in the following third embodiment.

Furthermore, the vehicle 10 is provided with a chassis unit 30 relating to a traveling function together with the top plate 14. The top plate 14 is, for example, a separate body from the upper surface of the chassis unit 30, and is mounted on the chassis unit 30. Alternatively, the top plate 14 may form the upper surface of the chassis unit 30.

Figure 4:
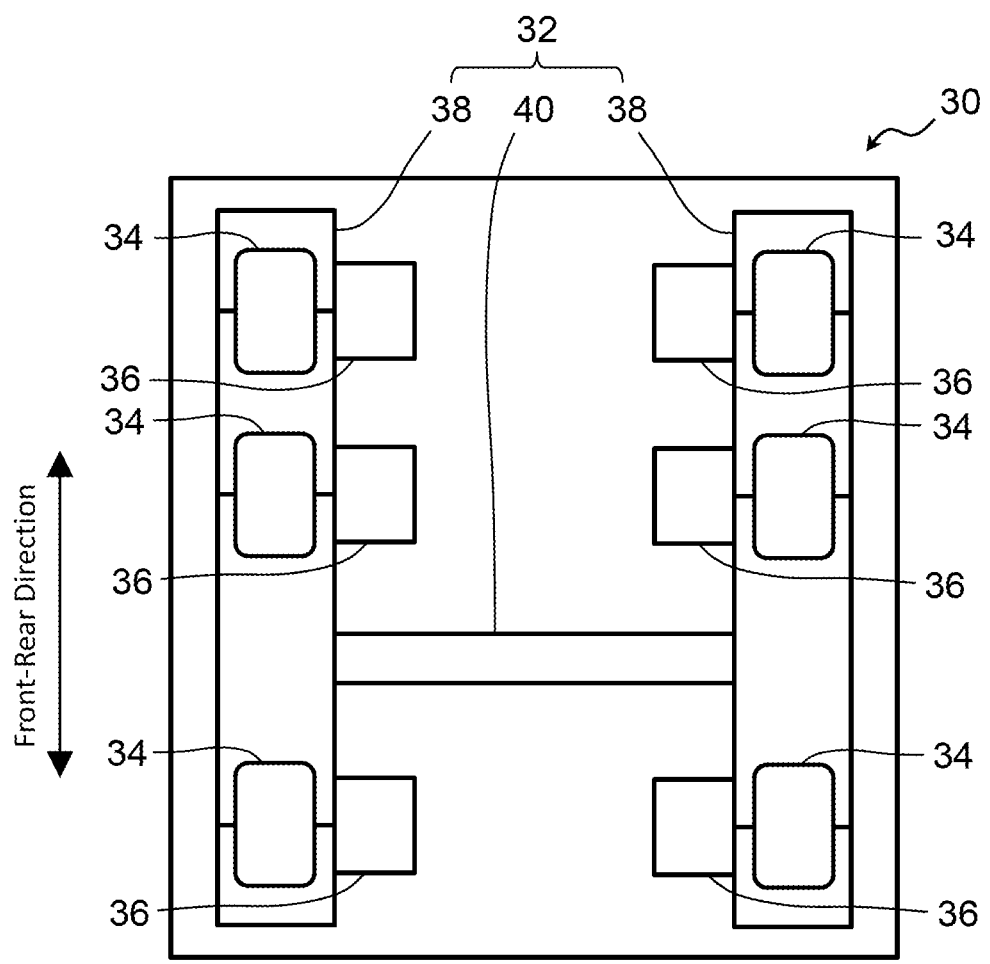
FIG. 4 is a diagram showing a configuration example of a chassis unit shown in FIG. 1.

FIG. 4 is referenced in addition to FIGS. 1 to 3. FIG. 4 is a diagram showing a configuration example of the chassis unit 30 shown in FIG. 1. The chassis unit 30 includes a frame 32, wheels 34, and electric motors 36. As an example, six wheels 34 are provided. More specifically, three wheels 34 are disposed on each of the left and right sides of the vehicle 10 in a bilaterally symmetrical manner. The electric motor 36 is provided, for example, coaxially with each of the six wheels 34.

It should be noted that the number of the wheels 34 is arbitrarily determined in accordance with requirements such as the riding capacity of the vehicle 10 and the required driving force thereof. Instead of six, for example, a total of four wheels, i.e., two wheels on the left and two wheels on the right, may be used. Further, the number of the electric motors 36 does not necessarily have to be the same as the number of the wheels 34, and may be changed according to requirements such as the required driving force. The electric motor 36 is an example of a power unit for driving the vehicle 10, and another example of the power unit is an internal combustion engine.

FIG. 4 shows a schematic shape of the frame 32. The frame 32 includes a main member 38 extending in the front-rear direction of the vehicle 10 on each of the left and right sides of the vehicle 10, and a sub-member 40 connecting the two main members 38. Three left wheels 34 and three electric motors 36 for driving them are fixed to the main member 38 on the left of the vehicle 10. Similarly, three right wheels 34 and three electric motors 36 for driving them are fixed to the main member 38 on the right of the vehicle 10.

Acceleration and deceleration of the vehicle 10 are performed by controlling the electric motors 36. Further, the vehicle 10 can be braked, for example, by using a regenerative brake realized by the control of the electric motors 36. The vehicle 10 may be provided with a mechanical brake on any wheel 34 for braking.

Moreover, according to the vehicle 10 including the above-described chassis unit 30, by providing a difference between the rotational speeds of the three wheels 34 on the left side and the rotational speeds of the three wheels 34 on the right side, the vehicle 10 can be turned to the left and right. In the example shown in FIG. 4, each wheel 34 is a wheel having a general structure in which a tire is incorporated. Instead of this kind of example, in order to increase the degree of freedom of turning of the vehicle 10, for example, the four wheels 34 positioned at both ends in the front-rear direction may be replaced by omnidirectional moving wheels (so-called omni wheels). Furthermore, instead of these examples, for example, a steering apparatus (e.g., electrically driven steering apparatus) may be used to turn the vehicle 10.

As described above, driving and turning of the vehicle 10 can be performed using the electric motors 36. Therefore, the electric motors 36 (power unit) fixed to the frame 32 corresponds to an example of the "traveling device" according to the present disclosure. In an example in which the above-described steering apparatus is provided with the electric motors 36, the electric motors 36 and the steering apparatus correspond to another example of the "traveling device". In addition, although the vehicle 10 according to the first embodiment is a wheeled vehicle including the wheels 34, the open vehicle according to the present disclosure is not limited to this, and may be configured as a tracked vehicle having an infinite track.

Figure 5:
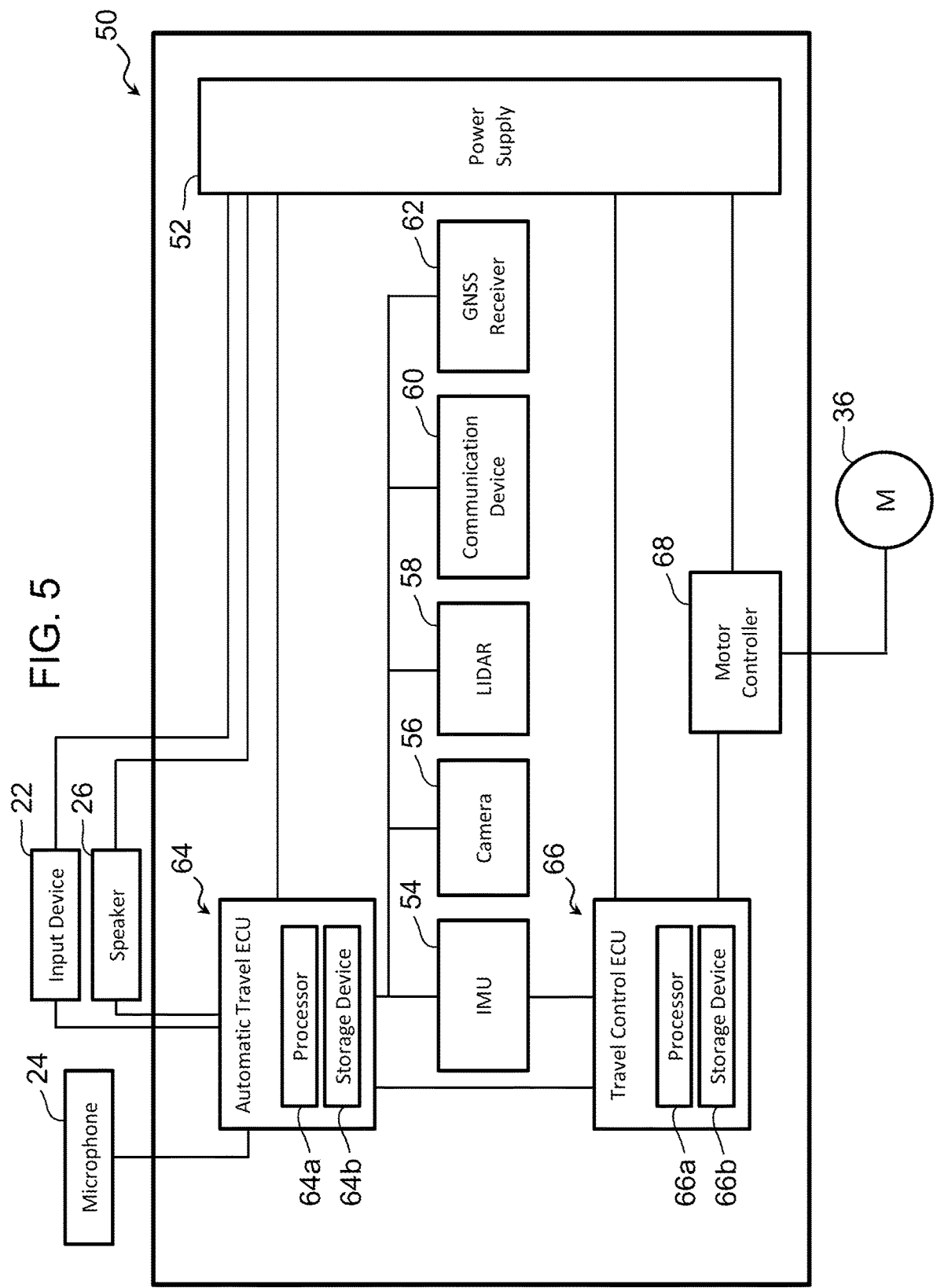
FIG. 5 is a block diagram schematically showing an example of the configuration of a control system for controlling the travel of the open vehicle shown in FIG. 1.

FIG. 5 is a block diagram schematically showing an example of the configuration of a control system 50 for controlling the travel of the open vehicle 10 shown in FIG. 1. The control system 50 is mounted on the open vehicle 10. The control system 50 is configured to cause the vehicle 10 to automatically travel.

As shown in FIG. 5, the control system 50 includes a power supply 52, an inertial measurement unit (IMU) 54, cameras 56, LIDARs (laser imaging detection and ranging) 58, a communication device 60, a global navigation satellite system (GNSS) receiver 62, an automatic travel electronic control unit (ECU) 64, a travel control ECU 66, and a motor controller 68. As shown in FIG. 1, the camera 56 is installed on each of the four supports 16, and the LIDAR 58 is installed on the back surface of each of the two backrests 18. As shown in FIG. 2, the components 52, 54, 60 to 68 of the control system 50 other than the cameras 56 and the LIDARs 58 are disposed between the frame 32 and the top plate 14.

The power supply 52 is typically a battery that is externally charged. The power supply 52 supplies electric power to each device (the electric motors 36, the control system 50, the input device 22, and the speaker 26) mounted on the vehicle 10. The IMU 54 detects angular velocities and accelerations of three axes. Therefore, according to the IMU 54, it is possible to acquire various traveling states such as the speed (i.e., vehicle speed V), the acceleration, and the posture of the vehicle 10. The IMU 54 transmits the acquired traveling states to the automatic travel ECU 64 and the travel control ECU 66.

The cameras 56 and the LIDARs 58 are examples of "one or more external sensors" for recognizing the surrounding environment of the vehicle 10. The four cameras (outward facing cameras) 56 photograph the surroundings of the vehicle 10 (more specifically, the front right, front left, rear right, and rear left of the vehicle 10). The two LIDARs 58 respectively detect objects in front of and behind the vehicle 10. According to the LIDAR 58, the distance and the direction of the detected object from the vehicle 10 can be acquired. The cameras 56 and the LIDARs 58 transmit the acquired information to the automatic travel ECU 64. Additionally, instead of the example shown in FIGS. 1 to 3, only one of the camera 56 and the LIDAR 58 may be used.

The communication device 60 performs communication (transmission and reception) with a communication device 72c of a management server 72 (see FIG. 6), which will be described later, via a wireless communication network such as 4G or 5G. Also, the communication device 60 communicates with a mobile terminal 3 (see FIG. 6), which will be described later, via a similar wireless communication network. The GNSS receiver 62 acquires the position and orientation of the vehicle 10 based on signals from GNSS satellites. The GNSS receiver 62 transmits the acquired information to the automatic travel ECU 64.

The automatic travel ECU 64 includes a processor 64a and a storage device 64b. The storage device 64b stores at least one program configured to cause the vehicle 10 to automatically travel. When the processor 64a reads and executes a program stored in the storage device 64b, various kinds of processing performed by the processor 64a are realized. Also, the storage device 64b stores map information as a map database. Alternatively, the processor 64a may acquire the map information from a map database stored in a storage device 72b (see FIG. 6) of the management server 72.

In an example of a use of the vehicle 10 (an example of using a vehicle dispatch service described below), the destination is transmitted from the mobile terminal 3 of the user to the automatic travel ECU 64 via the management server 72. The automatic travel ECU 64 (processor 64a) sets a target travel route RT from the current position of the vehicle 10 to the destination and a basic target vehicle speed Vtb, which is the basic value of the target vehicle speed (target speed of the vehicle 10), on the basis of the position information of the vehicle 10 from the GNSS receiver 62 and the map information of the map database. In addition, the processor 64a changes (updates) the set target travel route RT and the set basic target vehicle speed Vtb as necessary on the basis of the traveling state information and the position information of the vehicle 10 based on the IMU 54 and the GNSS receiver 62, and the information of the objects around the vehicle 10 acquired by the cameras 56 and the LIDARs 58.

The target travel route RT is also changed by an "automatic travel control process (process of moving the vehicle 10 away from a specific person)" described below in the first embodiment. Further, the target vehicle speed Vt is changed from the basic target vehicle speed Vtb by an "automatic travel control process (process of increasing the vehicle speed V)" described in a second embodiment to be described later.

The automatic travel ECU 64 transmits the latest target travel route RT and the final target vehicle speed Vt to the travel control ECU 66. The travel control ECU 66 includes a processor 66a and a storage device 66b. The storage device 66b stores various kinds of information necessary for the control of each electric motor 36 to cause the vehicle 10 to automatically travel. The processor 66a generates a control command value (more specifically, a command value such as a rotational speed and a rotation direction) of each electric motor 36 for causing the vehicle 10 to travel so as to achieve the target travel route RT and the target vehicle speed Vt. The processor 66a uses the information indicating the traveling state acquired by the IMU 54 to generate the control command value.

The travel control ECU 66 commands the generated control command value of each electric motor 36 to each motor controller 68. The motor controller 68 includes a drive circuit configured to control electric power supplied to the electric motors 36 from the power supply 52, and is provided for each of the six electric motors 36. Each motor controller 68 controls energization to each electric motor 36 according to the control command value from the travel control ECU 66.

According to the control by the automatic travel ECU 64 and the travel control ECU 66 described above, the vehicle 10 can automatically travel toward the destination. It should be noted that, in the example of the control system 50 shown in FIG. 5, the automatic travel ECU 64 and the travel control ECU 66 correspond to an example of "one or more electronic control units configured to control the traveling device" according to the present disclosure.

1-2. Configuration Example of Operation Management System of Vehicle

Figure 6:
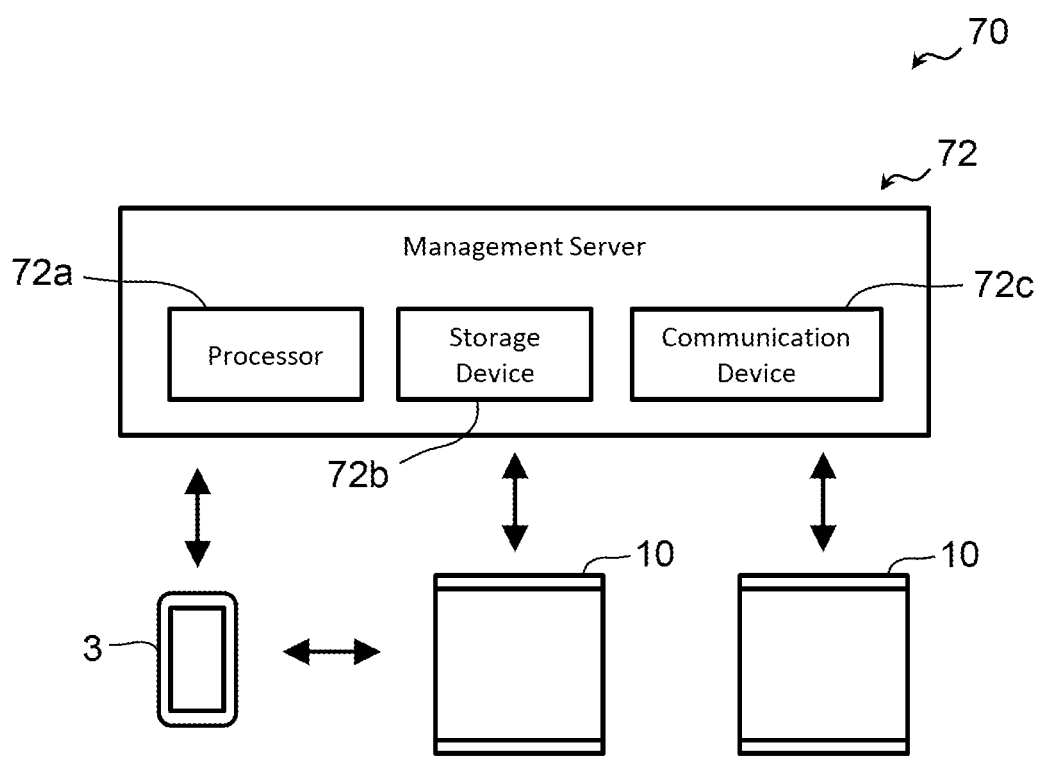
FIG. 6 is a block diagram schematically showing a configuration of an operation management system according to the first embodiment.

FIG. 6 is a block diagram schematically showing a configuration of the operation management system 70 according to the first embodiment. The vehicle 10 configured as described above can be used in various applications for moving people. One of the applications of such a vehicle 10 is a mobile service for moving the user by performing automatic traveling on a road (for example, road RD1 shown in FIGS. 7, 8 and 16 described below) on which a plurality of operation-managed vehicles 10 are planned to coexist with pedestrians.

When the above-described mobile service is provided with a vehicle dispatch service that dispatches the vehicle 10 in response to a request from the user, it becomes more convenient. In order to realize a mobile service involving vehicle dispatch, the operation management system 70 includes at least one vehicle 10 (typically, a plurality of vehicles 10 as shown in FIG. 6), a mobile terminal 3, and a management server 72. The mobile terminal 3 is carried by the user of the vehicle 10 and is, for example, a smartphone or a tablet personal computer. The mobile terminal 3 includes a processor, a storage device, and a communication device.

The management server 72 includes a processor 72a, a storage device 72b, and a communication device 72c. The storage device 72b stores at least one program for the mobile service including vehicle dispatch. The processor 72a reads and executes a program stored in the storage device 72b.

Accordingly, various functions for providing the mobile service including vehicle dispatch are realized. For example, the management server 72 (communication device 72c) communicates with the communication device 60 of each vehicle 10 and the mobile terminal 3 via a wireless communication network. The management server 72 manages user information. Further, the management server 72 performs operation management of the plurality of vehicles 10 including the vehicle dispatch service. The operation management of the plurality of vehicles 10 by the management server 72 may include, for example, a remote operation of the vehicle 10 in an emergency by an operator via the management server 72.

1-3. Outline of Meeting Traveling Mode with Specific Person Recognition Process and Automatic Travel Control Process On the vehicle 10 on which a plurality of users can ride, the plurality of users can hold a meeting during the ride. Since this kind of meeting is a meeting on the move using the vehicle 10, it is hereinafter referred to as a "mobile meeting".

Figure 7:
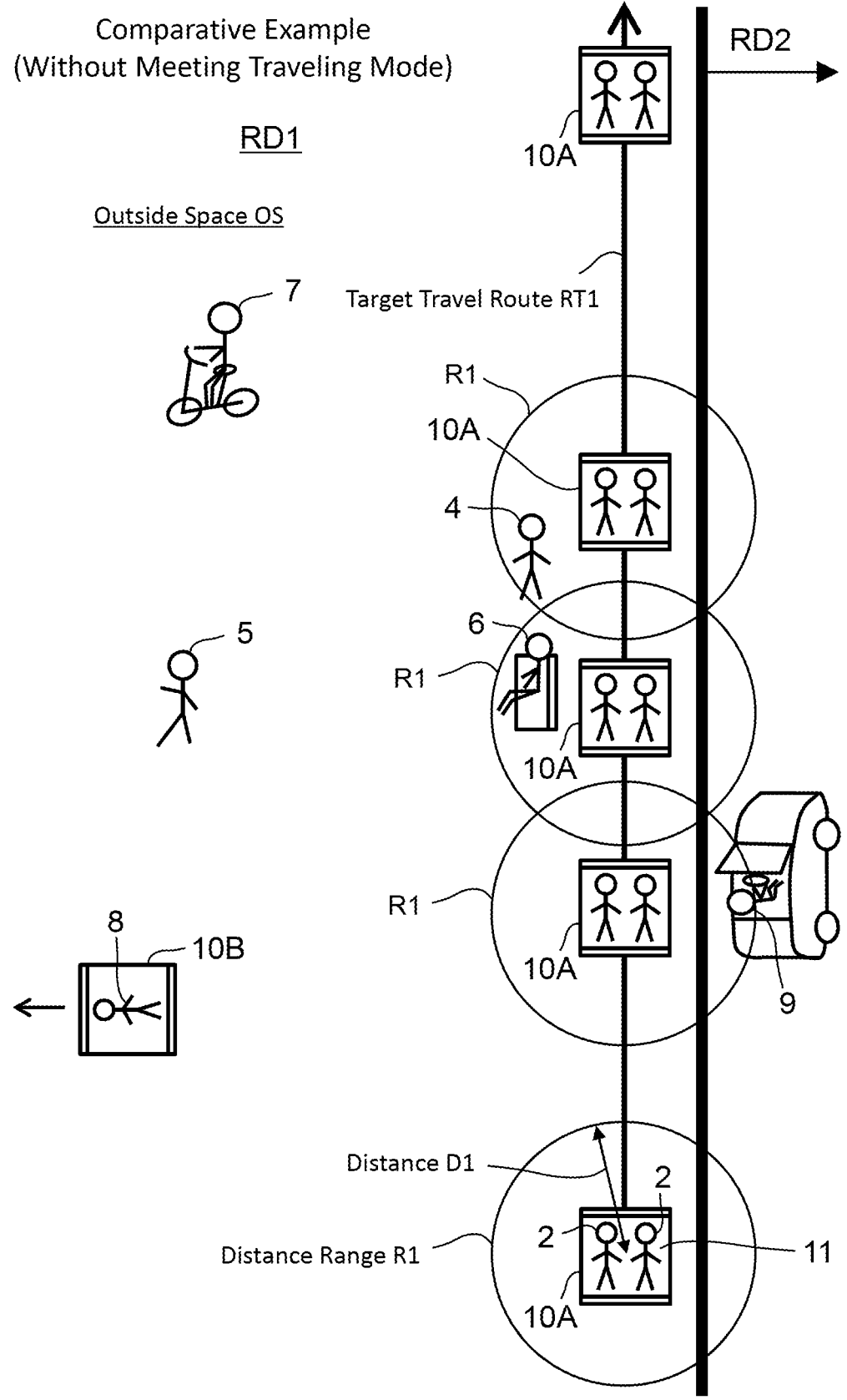
FIG. 7 is a diagram used to describe an issue relating to a mobile meeting on the open vehicle.

FIG. 7 is a diagram used to describe an issue relating to the mobile meeting on the vehicle 10 (broadly speaking, an issue relating to the conversation in the vehicle 10). FIG. 7 corresponds to a comparative example without the "meeting traveling mode" according to the first embodiment, and will be described for comparison with FIG. 8 to be described later. FIG. 7 shows a road RD1 in which a plurality of vehicles 10 are planned to coexist with pedestrians, and an automobile road RD2.

Two users 2, pedestrians 4 and 5, persons 6 and 7, and a user 8 are exemplified on the road RD1. The two users 2 who hold a mobile meeting are on a vehicle 10A. The person 6 is sitting on a bench. The person 7 is riding on a bicycle. The user 8 is moving on another vehicle 10B. On the other hand, a person 9 riding in a stopped open car is exemplified on the automobile road RD2.

In FIG. 7, the persons 4 to 9 other than the two users 2 exist in the outside space OS which is not shielded from the riding space 11 of the vehicle 10A. Hereinafter, for the convenience of explanation, this kind of person will be referred to as a "specific person". As illustrated in FIG. 7, a person existing in the outside space OS corresponds to the specific person mentioned here, regardless of whether or not the person is moving and whether or not the person is in an open vehicle (e.g., a car, a bicycle, or a motorcycle, or another vehicle). Thus, for example, a person riding in a car with a roof and windows corresponds to the specific person if the roof or one or more windows are open, and does not corresponds to the specific person if the roof and all windows are closed.

Circles surrounding the vehicle 10A in FIG. 7 each show a distance range R1 within a distance D1 from the vehicle 10. For convenience, the distance range R1 is represented as a distance range from the center of the vehicle 10. The distance D1 that specifies the distance range R1 corresponds to a limit distance at which the conversation of the users 2 in the vehicle 10A can be heard by a specific person around the vehicle 10A.

In the comparative example shown in FIG. 7, when the vehicle 10A travels along a target travel route RT1 as shown in FIG. 7, the specific persons 9, 6, and 4 sequentially enter the distance range R1. As a result, the conversation within the riding space 11 of the vehicle 10A may be heard by these specific persons 9, 6, and 4. In this regard, if it is possible to make it difficult for a person outside the vehicle 10A to hear the conversation in the riding space 11 by using the automatic travel control, the vehicle 10 can be used as a mobile meeting space in which confidentiality is secured. This is favorable because it leads to improvement in the convenience of the vehicle 10.

In view of the issue described above, according to the first embodiment, the following "meeting traveling mode" is executed on the vehicle 10 during execution of the mobile service accompanied by the vehicle dispatch by the operation management system 70.

Figure 8:
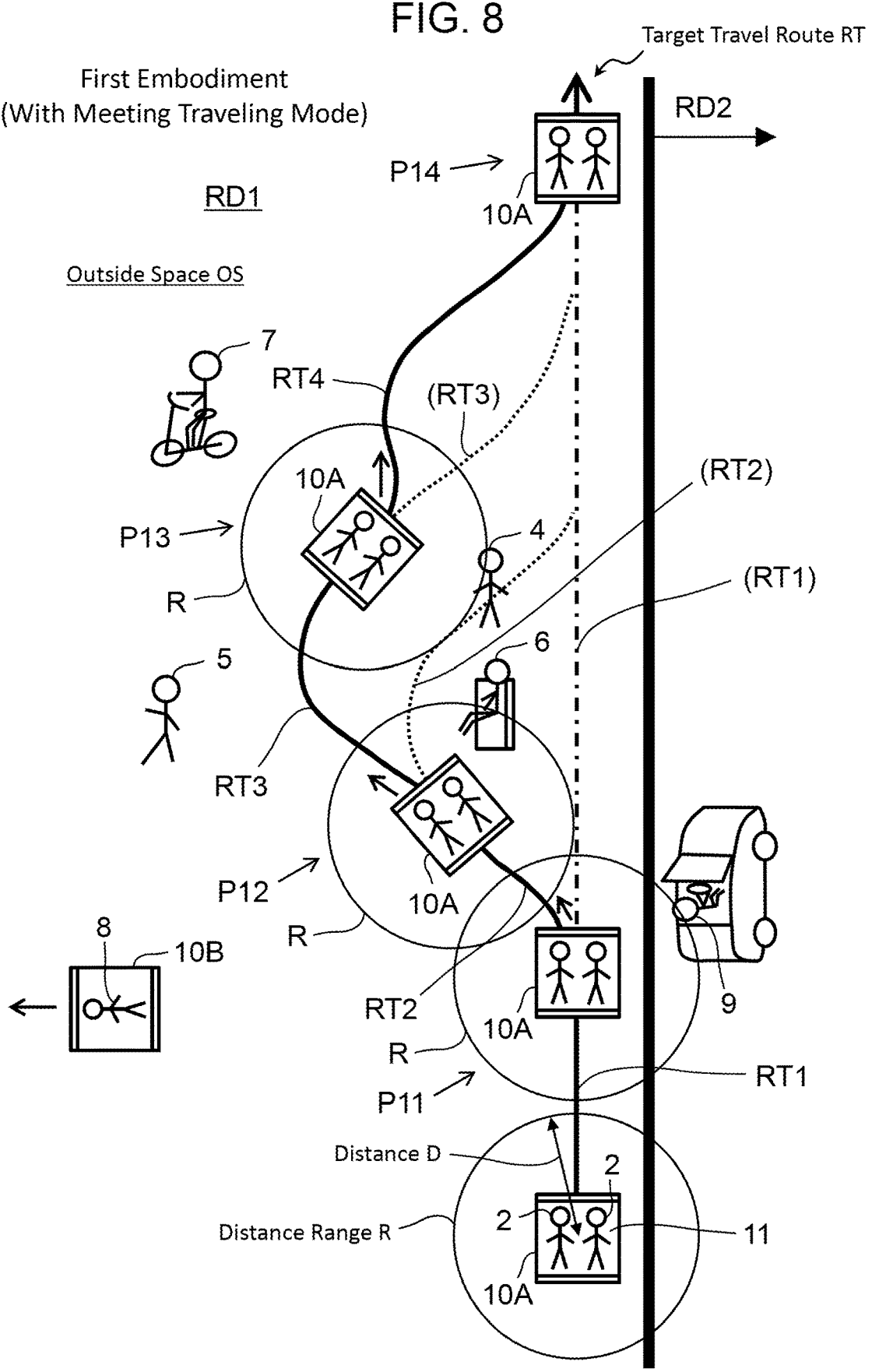
FIG. 8 is a diagram showing an example of automatic traveling of the open vehicle during execution of a meeting traveling mode according to the first embodiment.

Specifically, according to the first embodiment, the meeting traveling mode is executed after the automatic travel ECU 64 receives a "destination of the vehicle 10" and a "mobile meeting request" from a plurality of users (e.g., two users 2 in FIG. 8). The meeting traveling mode is executed until the vehicle 10 reaches the destination.

In the first embodiment, the automatic travel ECU 64 mainly executes the meeting traveling mode. In the meeting traveling mode, the automatic travel ECU 64 generates a target travel route RT from the departure point to the destination. The automatic travel ECU 64 then executes the following "specific person recognition process", and also executes the following "automatic travel control process" together with the travel control ECU 66.

The specific person recognition process is a process of recognizing a specific person existing in the outside space OS that is not shielded from the riding space 11 of the vehicle 10A by using the cameras 56 and the LIDARs 58 which are external sensors. Then, the automatic travel control process is a process of controlling the electric motors 36 (traveling device) so as to execute "moving (keeping) the open vehicle 10 away from the specific person" when the specific person exists within a predetermined distance range R.

The predetermined distance range R is specified by a predetermined distance D from the vehicle 10 (e.g., the center of the vehicle 10). More specifically, the predetermined distance D can be determined as a distance necessary to make the conversation of the users on the vehicle 10 difficult for the specific person to hear, based on, for example, the results of an experiment performed in advance. For example, the limit distance D1 as described above can be determined by, for example, experiment, and the obtained limit distance D1 can be used as the predetermined distance D. In addition, the predetermined distance D is longer than a distance used for avoiding a collision with an object such as a person in a basic automatic travel function of the automatic travel ECU 64.

The storage device 64b of the automatic travel ECU 64 stores at least one program related to the specific person recognition process and the automatic travel control process. The processor 64a reads and executes a program stored in the storage device 64b, the specific person recognition process and the automatic travel control process are realized.

FIG. 8 is a diagram showing an example of automatic traveling of the vehicle 10A during execution of the meeting traveling mode according to the first embodiment. In the vehicle 10A that automatically travels along a generated target travel route RT (e.g., RT1 to RT4 in FIG. 8), the automatic travel ECU 64 can sequentially recognize the surrounding specific persons such as the specific persons 4 to 9 during traveling by executing the specific person recognition process.

In the example shown in FIG. 8, when the vehicle 10A reaches a traveling position P11 during the automatic traveling along the target travel route RT1, the automatic travel ECU 64 detects that the specific person 9 riding in the open car exists (has entered) within the predetermined distance range R in the automatic travel control process. Along with this, the automatic travel ECU 64 controls the electric motors 36 so as to move the vehicle 10A away from the specific person 9.

Specifically, the automatic travel ECU 64 changes (updates) the target travel route RT from RT1 to RT2 so as to move the vehicle 10A away from the specific person 9. In more detail, as indicated by a broken line in FIG. 8, for example, the target travel route RT is changed so as to return to the original target travel route RT1 (dashed line) after avoiding the specific person 9. The travel control ECU 66 controls the electric motors 36 such that the vehicle 10 travels along the changed target travel route RT2.

Then, when the vehicle 10A reaches a traveling position P12 during the automatic traveling along the target travel route RT2, the automatic travel ECU 64 detects that the specific person 6 has entered within the predetermined distance R. Along with this, the automatic travel ECU 64 further changes the target travel route RT from RT2 to RT3 so as to move the vehicle 10A away from the specific person 6.

Hereinafter, similarly, when the specific person 4 enters the predetermined distance range R at a traveling position P13 during the automatic traveling along the target travel route RT3, the automatic travel ECU 64 further changes the target travel route RT from RT3 to RT4 so as to move the vehicle 10A away from the specific person 4. In the example shown in FIG. 8, the vehicle 10A can return to the original target travel route RT1 at a traveling position P14 during the automatic traveling along the target travel route RT4.

According to the specific person recognition process and the automatic travel control process described above, when a specific person exists within the predetermined distance range R, the vehicle 10 can be automatically driven so as to move away from the specific person. In addition, as the predetermined distance D that specifies the predetermined distance range R, a distance D2 that is longer than the limit distance D1 by a predetermined value may be used. This makes it possible to perform automatic travel control such that a specific person does not enter the range R1 of the limit distance D1.

1-4. Process Flow in Operation Management System

Figure 9:
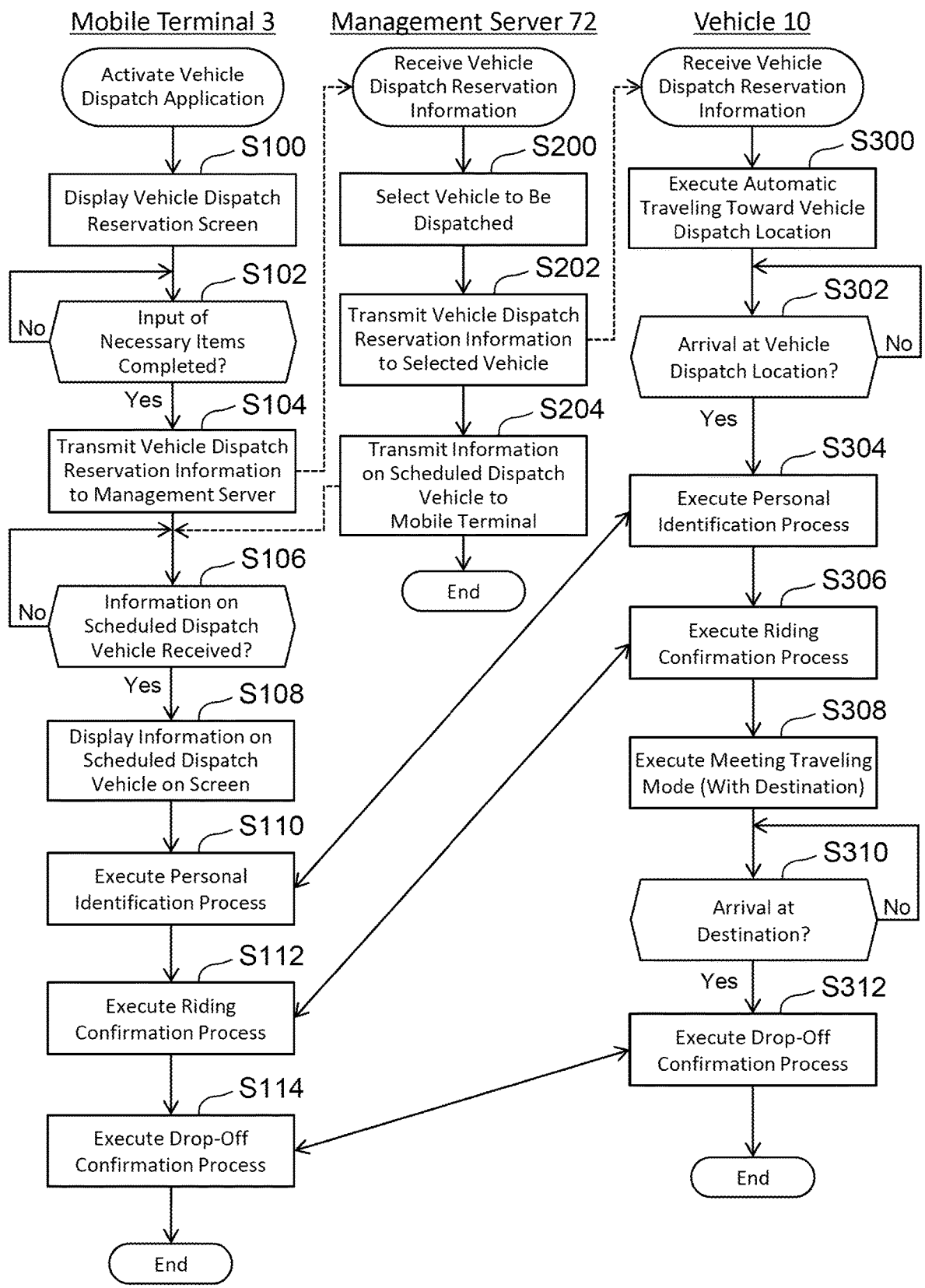
FIG. 9 is a flowchart showing an example of the flow of processing performed by the operation management system in the first embodiment.

FIG. 9 is a flowchart showing an example of the flow of processing performed by the operation management system 70 in the first embodiment. The mobile service of the first embodiment using the vehicle 10 is achieved by the processing shown in FIG. 9 performed by the operation management system 70. In FIG. 9, the processing by the mobile terminal 3, the management server 72, and the vehicle 10 is comprehensively represented.

The processing in the mobile terminal 3 (processor) is started when one of a plurality of users who wish to ride on the vehicle 10 operates a mobile terminal 3 to activate a dedicated vehicle dispatch application. In step S100, the mobile terminal 3 displays a vehicle dispatch reservation screen. The user uses the vehicle dispatch reservation screen to input necessary items such as personal information that identifies the user and vehicle dispatch reservation information, and presses the send button.

In the first embodiment, the vehicle dispatch reservation information input by the user includes a "destination" and a "mobile meeting request" as well as a desired vehicle dispatch location (pickup location) and a desired vehicle dispatch time. In step S102, the mobile terminal 3 confirms that the input of the necessary items has been completed. If the input is completed correctly, the processing proceeds to step S104.

In step S104, the mobile terminal 3 transmits the vehicle dispatch reservation information inputted by the user to the management server 72. Thereafter, the mobile terminal 3 repeatedly executes the processing of step S106 until it receives from the management server 72 the information of the vehicle 10 scheduled to be dispatched.

The processing in the management server 72 is started when the management server 72 (processor 72a) receives the vehicle dispatch reservation information from the mobile terminal 3. In step S200, the management server 72 selects an appropriate vehicle 10 from one or a plurality of vehicles 10 around the user for the vehicle dispatch. Thereafter, the processing proceeds to step S202.

In step S202, the management server 72 transmits the vehicle dispatch reservation information to the selected vehicle 10. Then, in step S204, the managing server 72 transmits to the mobile terminal 3 the selected vehicle 10 scheduled to be dispatched. As a result, the processing of the management server 72 is completed.

After receiving the information on the vehicle 10 scheduled to be dispatched in step S106, the mobile terminal 3 displays the information of the vehicle 10 on the screen in step S108. In order to make it easier for the user to notice the vehicle 10 that reaches the desired vehicle dispatch location, the information includes, for example, the color and number of the vehicle 10 to be dispatched.

The processing in the vehicle 10 selected by the management server 72 is started when the automatic travel ECU 64 (processor 64a) receives the vehicle dispatch reservation information from the management server 72. In step S300, the automatic travel ECU 64 performs automatic traveling such that the vehicle 10 arrives at the vehicle dispatch location at the vehicle dispatch time based on the vehicle dispatch reservation information. Thereafter, the automatic travel ECU 64 repeatedly executes the processing of step S302 until the vehicle 10 arrives at the vehicle dispatch location.

After the vehicle 10 arrives at the vehicle dispatch location (step S302), the automatic travel ECU 64 executes a predetermined personal identification process with the mobile terminal 3 (steps S304 and S110). When this personal identification process is successful, a predetermined riding confirmation process is executed between the automatic travel ECU 64 and the mobile terminal 3 (steps S306 and S112). It should be noted that, if the personal identification process or the riding confirmation process is not completed, the vehicle dispatch reservation is finally canceled.

After the riding confirmation process is completed in steps S306 and S112, the processing of the automatic travel ECU 64 proceeds to step S308. In step S308, the automatic travel ECU 64 executes (starts) the meeting traveling mode. Based on the mobile meeting request included in the vehicle dispatch reservation information, the meeting traveling mode is executed toward the destination also included in the vehicle dispatch reservation information. Thereafter, the processing proceeds to step S310.

In step S310, after the meeting driving mode is started, the automatic travel ECU 64 determines whether the vehicle 10 has arrived at the destination. After the vehicle 10 arrives at the destination, the automatic travel ECU 64 executes a predetermined drop-off confirmation process with the mobile terminal 3 (steps S312 and S114). When the drop-off confirmation process is completed, the processing in the automatic travel ECU 64 and the mobile terminal 3 relating to the current mobile service (mobile meeting service) by the operation management system 70 is also completed.

Figure 10:
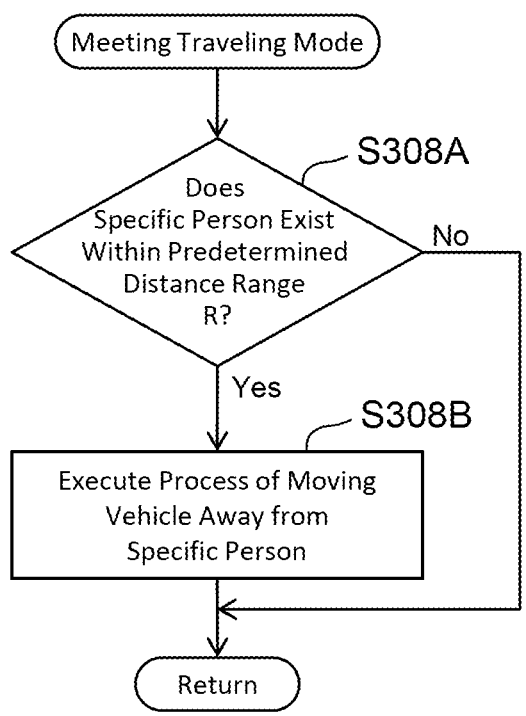
FIG. 10 is a flowchart showing details of the processing of step S308 (meeting traveling mode) in FIG. 9.

FIG. 10 is a flowchart showing details of the processing of step S308 (meeting traveling mode) in FIG. 9. The automatic travel ECU 64 repeatedly executes the processing of this flowchart at a predetermined cycle during the execution of the meeting traveling mode. The processing of step S308A in this flowchart corresponds to the specific person recognition process and a part of the automatic travel control process, and the processing of step S308B corresponds to the remaining part of the automatic travel control process.

More specifically, in step S308A, the automatic travel ECU 64 recognizes a specific person around the vehicle 10 by performing the specific person recognition process. Then, in the automatic travel control process, the automatic travel ECU 64 determines whether or not a specific person such as a pedestrian exists within the predetermined distance range R of the vehicle 10. The distance between the vehicle 10 and the specific person can be measured using, for example, the LIDAR 58. A fixed value is used here as an example of the predetermined distance D that specifies the predetermined distance range R.

When there are no specific persons within the predetermined distance range R in step S308A, the automatic travel ECU 64 ends the current processing cycle. On the other hand, when one or more specific persons exist within the predetermined distance range R, the automatic travel ECU 64 executes the remaining part of the automatic travel control process in step S308B. Specifically, as described with reference to FIG. 8, the automatic travel ECU 64 changes the target travel route RT in order to move the vehicle 10 away from the detected specific person.

1-5. Effect

According to the first embodiment described so far, when a specific person exists within the predetermined distance range R from the vehicle 10, the automatic travel control of the vehicle 10 is executed so as to move away from the specific person. As a result, it is possible to make it difficult for people outside the vehicle 10 to hear the conversation in the riding space 11. Therefore, the vehicle 10 suitable for protecting the privacy of conversation of users on the move. In other words, riding and continuing to move with the vehicle 10 can be used to protect the privacy of conversation.

Moreover, in the first embodiment, the automatic travel control described above is executed as the meeting traveling mode in response to a mobile meeting request from the users. Therefore, the vehicle 10 can be used to provide a mobile meeting service (in other words, mobile meeting system) in which the confidentiality of the conversation is well secured. Also, in the first embodiment, the meeting traveling mode is executed with the destination. Therefore, the travel time to the destination can be effectively used for the meeting.

Furthermore, in the first embodiment, the meeting traveling mode described above is executed on the vehicle 10 reserved by using the vehicle dispatch service by the operation management system 70. Therefore, a reservation-based mobile meeting space can be provided. In addition, people may want to have conversations on the go so that they do not want others to hear. However, it is difficult to satisfy such a demand in spaces such as cafes or taxis that are close to others. Moreover, on the go, it can be difficult to find a private room that satisfies the demand. On the other hand, the operation management system 70 is a suitable option for satisfying the demand.

1-6. Other Examples of Mobile Meeting Service

1-6-1. Example A without Destination

Figure 11:
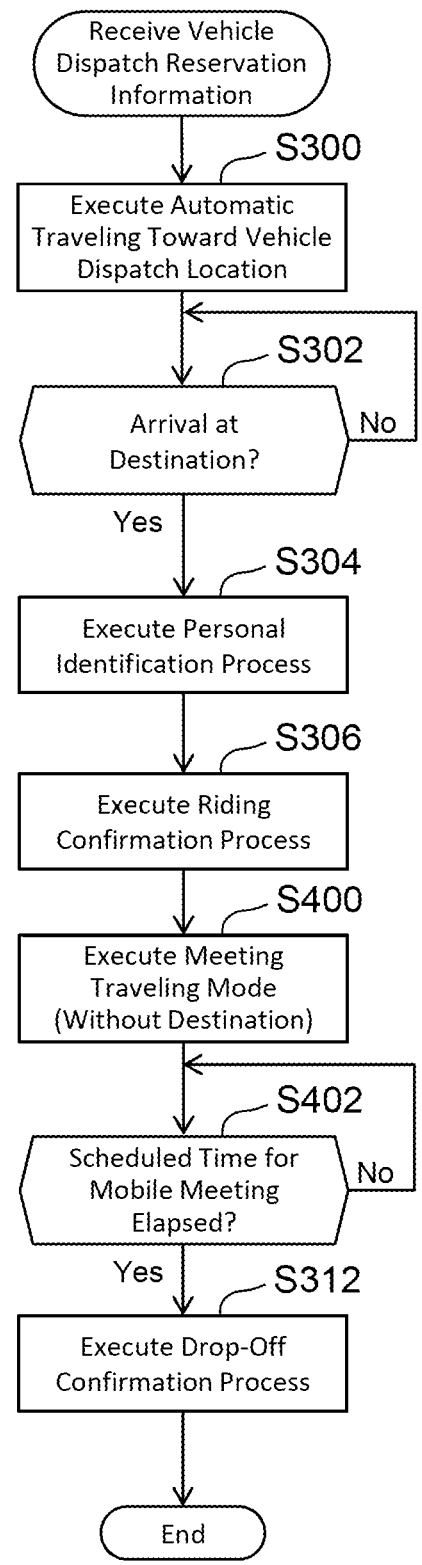
FIG. 11 is a flowchart showing another example of the processing of the open vehicle included in the processing performed by the operation management system in the first embodiment.

FIG. 11 is a flowchart showing another example of the processing of the vehicle 10 included in the processing performed by the operation management system 70 in the first embodiment. In the Example A of the mobile meeting service described with reference to FIG. 11, the automatic travel ECU 64 executes the processing of this flowchart instead of the processing of the vehicle 10 shown in FIG. 9. In this Example A, the remaining processing of the mobile terminal 3 and the management server 72 is the same as that shown in FIG. 9 except as described below.

In the example shown in FIG. 9 described above, the vehicle dispatch reservation information received by the vehicle 10 from the mobile terminal 3 via the management server 72 includes the destination and the mobile meeting request. On the other hand, in the Example A, the vehicle dispatch reservation information received by the vehicle 10 does not include such a destination, but instead includes a "scheduled time for the mobile meeting" along with the mobile meeting request.

In FIG. 11, the automatic travel ECU 64 executes (starts) the meeting traveling mode without the destination in step S400 after executing the riding confirmation process (step S306). The meeting traveling mode is executed until the scheduled time (i.e., meeting time) included in the vehicle dispatch reservation information elapses in the following step S402. It should be noted that meetings may end earlier than scheduled or may be overdue. For this reason, the automatic travel ECU 64 may accept shortening or extension of the scheduled time (meeting time) from the users during the use of the service via the mobile terminal 3 or an HMI device (not shown) mounted on the vehicle 10.

By executing the program stored in the storage device 64b, the automatic travel ECU 64 (processor 64a) can perform the meeting traveling mode without a destination until the scheduled time elapses using, for example, the following method. That is, the automatic travel ECU 64 randomly generates an initial target travel route RT0 for automatically traveling in a predetermined area around the position of the vehicle 10 at the start of the meeting traveling mode over the scheduled time on the basis of the position information and the map information of the vehicle 10. Then, the automatic travel ECU 64 changes the target travel route RT as required in the automatic travel control process during the automatic traveling along the initial target travel route RT0 thus generated.

In the Example A, when the scheduled time (meeting time) has elapsed in step S402, the processing proceeds to the drop-off confirmation process executed by the automatic travel ECU 64 and the mobile terminal 3 (step S312 and S114). The plan for the users to get off when the scheduled time has elapsed may be included in the vehicle dispatch reservation information together with, for example, the scheduled time. Alternatively, the automatic travel ECU 64 may notify the users to get off the vehicle 10 via the mobile terminal 3 or an HMI device (not shown) mounted on the vehicle 10 after the scheduled time actually elapses in step S402.

According to the Example A without a destination, a meeting traveling mode is realized as if the vehicle 10 moves autonomously in search of a place where no specific person is present. In addition, in the Example A without a destination, the vehicle 10 does not necessarily have to keep moving during the meeting traveling mode. Specifically, the automatic travel ECU 64 may temporarily stop the vehicle 10 after the vehicle 10 has moved to a position where no specific person exists within the predetermined distance range R. Then, when a specific person enters the predetermined distance range R after that, the automatic travel ECU 64 may restart the movement of the vehicle 10 to keep away from the specific person.

1-6-2. Example B without Destination

Figure 12:
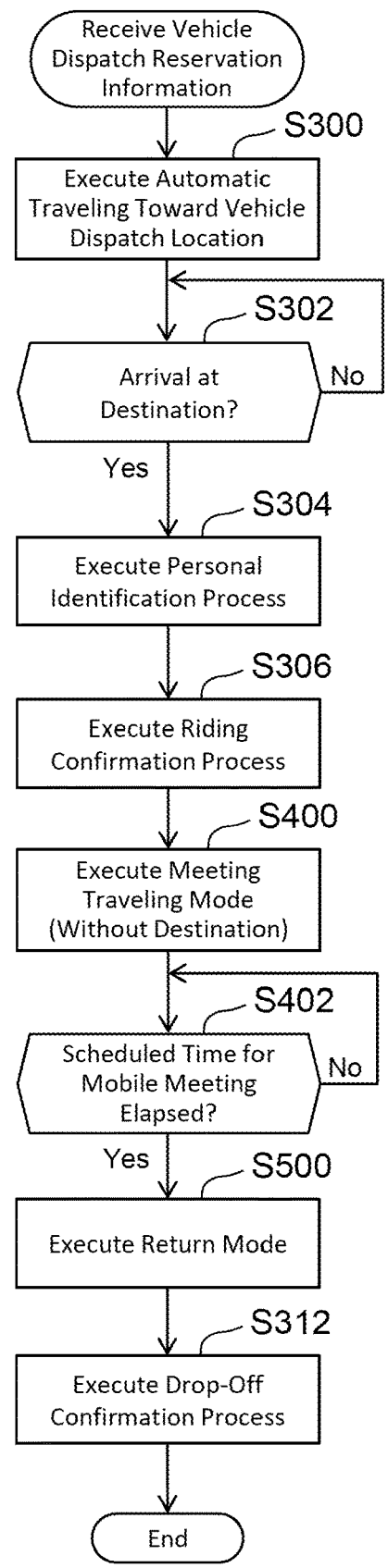
FIG. 12 is a flowchart showing still another example of the processing of the open vehicle included in the processing performed by the operation management system in the first embodiment.

FIG. 12 is a flowchart showing still another example of the processing of the vehicle 10 included in the processing performed by the operation management system 70 in the first embodiment. The Example B described with reference to FIG. 12 is different from the Example A described above in that the following "return mode" is additionally used.

In FIG. 12, after the scheduled time (meeting time) has elapsed in step S402, the automatic travel ECU 64 executes a return mode in step S500. In the return mode, the electric motors 36 (traveling device) are controlled such that the vehicle 10 returns to the starting location (departure location) of the meeting traveling mode. Specifically, in the return mode, the automatic travel ECU 64 generates a target travel route RT with a starting location as the destination, and transmits the generated target travel route RT to the travel control ECU 66. By additionally providing this kind of return mode, the convenience of the mobile meeting using the vehicle 10 can be further improved.

The plan to execute the return mode after the scheduled time has elapsed may be included in the vehicle dispatch reservation information together with, for example, the scheduled time as a return request from the users. Alternatively, after the scheduled time actually elapses in step S402, the automatic travel ECU 64 may confirm with the users whether or not the return mode needs to be executed via the mobile terminal 3 or an HMI device (not shown) mounted on the vehicle 10.

In addition, in an Example C (not shown) similar to the above described Example B, the automatic travel ECU 64 may generate an initial target travel route RT0 during the meeting traveling mode as follows. That is, the automatic travel ECU 64 may generate the initial target travel route RT0 such that the vehicle 10 returns to the starting location (departure location) of the meeting traveling mode at the end time of the scheduled time of the mobile meeting on the basis of the position information and the map information of the vehicle 10.

1-7. Another Setting Example of Predetermined Distance Range R

In step S308A described above (see FIG. 10), the predetermined distance D is a fixed value. As the predetermined distance D becomes longer with the above described limit distance D1 as the limit, it is possible to make it more difficult for a specific person to hear the conversation. Accordingly, instead of the example of the fixed value, the predetermined distance D may be changed as follows in accordance with, for example, at least one of the vehicle speed Vt, the voice volume VV of conversation of a plurality of users in the riding space 11, and the confidentiality level of conversation of the plurality of users in the riding space 11.

Figure 13:
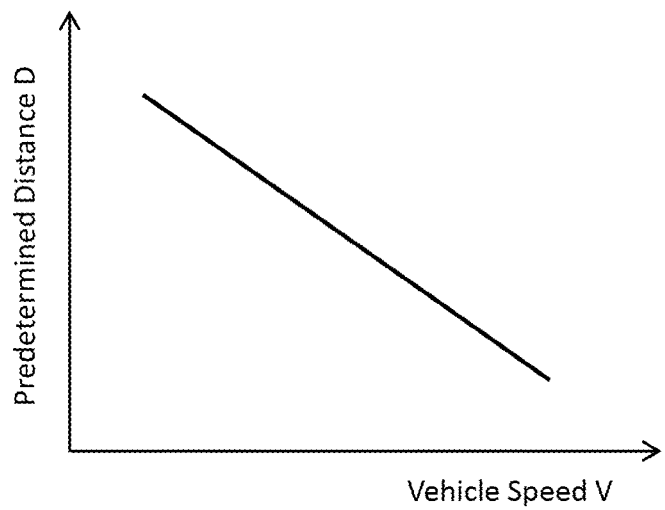
FIG. 13 is a graph showing an example of the relation between a predetermined distance D and a vehicle speed V.

FIG. 13 is a graph showing an example of the relation between the predetermined distance D and the vehicle speed V. The lower the vehicle speed V of the vehicle 10 is, the longer the travel time in the vicinity of the specific person becomes, so that the conversation becomes easier to hear. In view of this issue, in the example shown in FIG. 13, the predetermined distance D is set to be longer when the vehicle speed V is low than when the vehicle speed V is high. As a result, it is possible to appropriately set the securing of the predetermined distance D for making the conversation more difficult to hear in accordance with the vehicle speed V. More specifically, when the vehicle speed V is low, it is possible to prevent the conversation from being easily heard due to the lack of the predetermined distance D. Also, at high vehicle speeds in which it is not necessary to lengthen the predetermined distance D as compared to low vehicle speeds, it is possible to reduce a decrease in the degree of freedom in changing the target travel route RT due to the excess of the predetermined distance D. As the vehicle speed V for changing the predetermined distance D, the actual vehicle speed obtained using the IMU 54 or the target vehicle speed Vt can be used.

It should be noted that the predetermined distance D may be continuously (e.g., linearly) lengthened as the vehicle speed V decreases as in the example shown in FIG. 13, or may be lengthened in a stepwise fashion as the vehicle speed V decreases. Also, the predetermined distance D associated with the vehicle speed V may be set to the above-described limit distance D1, or may be set with a distance D2 longer than the limit distance D1 by a predetermined value as an upper limit. The same applies to the setting examples shown in FIGS. 14 and 15 described below.

Figure 14:
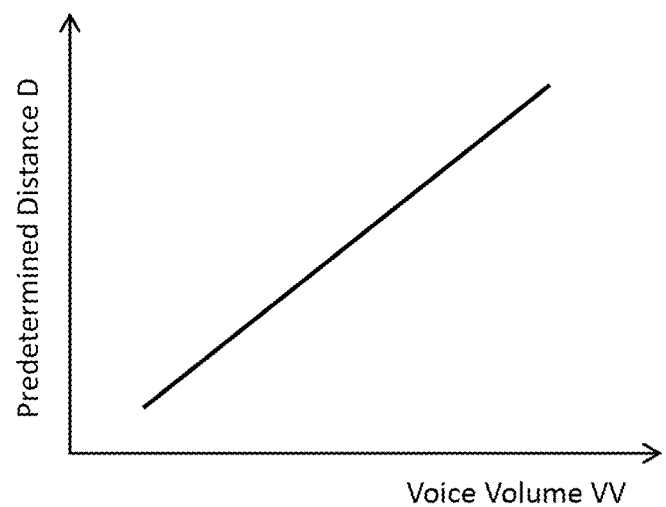
FIG. 14 is a graph showing an example of the relation between the predetermined distance D and a voice volume VV.

FIG. 14 is a graph showing an example of the relation between the predetermined distance D and the voice volume VV. The voice volume VV of the conversation on the vehicle 10 can be measured using, for example, the microphone 24 (see FIG. 2). The louder the volume VV is, the easier the conversation is to hear. In view of this, in the example shown in FIG. 14, the predetermined distance D is set to be longer when the voice volume VV is large than when the voice volume VV is small. As a result, it is possible to appropriately set the securing of the predetermined distance D for making the conversation more difficult to hear in accordance with the voice volume VV.

Figure 15:
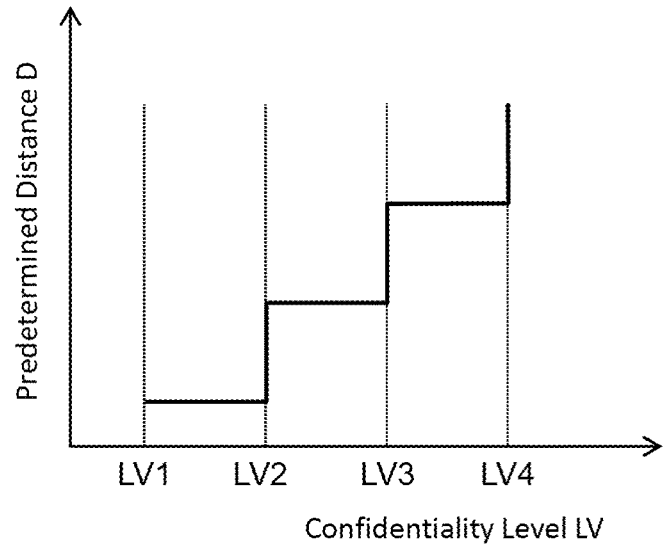
FIG. 15 is a graph showing an example of the relation between the predetermined distance D and a confidentiality level LV of conversation.

FIG. 15 is a graph showing an example of the relation between the predetermined distance D and the confidentiality level LV of the conversation. The confidentiality level LV of the conversation taking place on the vehicle 10 is not always uniform. Also, when the confidentiality level LV is higher, the users may want to make it harder for others to hear the conversation. Accordingly, in the example shown in FIG. 15, the predetermined distance D is set to be longer when the confidentiality level LV is high than when the confidentiality level LV is low. As a result, it is possible to appropriately set the securing of the predetermined distance D for making the conversation more difficult to hear in accordance with the confidentiality level LV. In FIG. 15, as an example, the predetermined distance D is changed in a stepwise fashion in accordance with the four confidentiality levels LV1 to LV4.

The automatic travel ECU 64 can receive information indicating the confidentiality level LV by using, for example, the input device 22 (see FIG. 3) operated by the user on the vehicle 10. Alternatively, the information may be transmitted from the mobile terminal 3 operated by the user to the vehicle 10. Moreover, in an example of using the vehicle dispatch service, the confidentiality level LV may be included in the vehicle dispatch reservation information at the time of reservation of the vehicle 10. Furthermore, the confidentiality level LV may be appropriately changed by the operation of the input device 22 or the mobile terminal 3 by the user during the mobile meeting. As a result of this, when the user finds that a specific person (for example, an adult, not a child) who the user particularly wants to avoid exists around the vehicle 10, the degree of distance secured for the specific person in the automatic travel control can be freely changed based on the intention of the user.

2. Second Embodiment

A second embodiment is different from the first embodiment described above in that, as the automatic travel control process, a process of increasing the vehicle speed V is used instead of the process of moving the vehicle 10 away from a specific person.

2-1. Outline of Automatic Travel Control Process (Process to Increase Vehicle Speed V)

Figure 16:
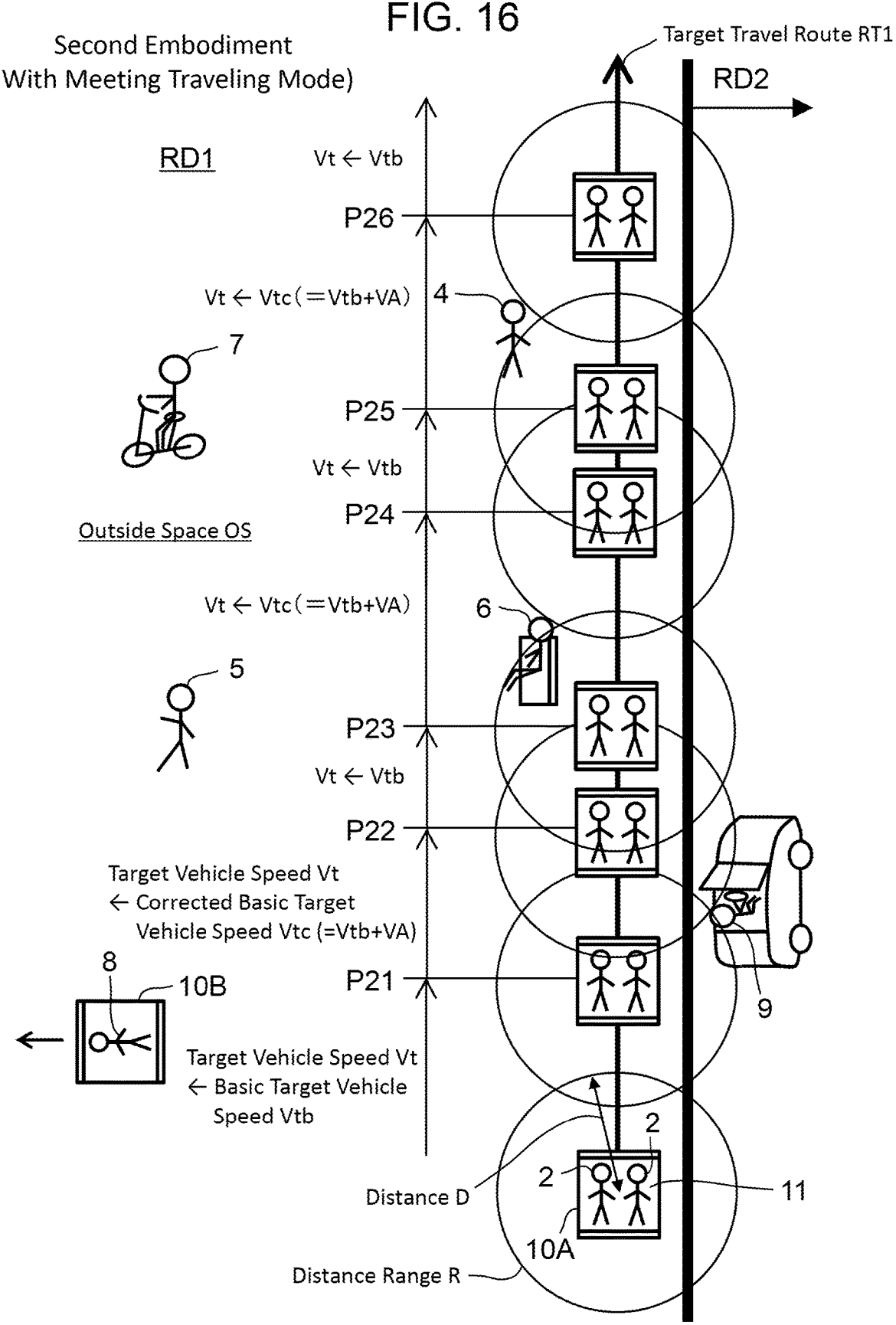
FIG. 16 is a diagram showing an example of automatic traveling of the open vehicle during a meeting traveling mode according to a second embodiment.

FIG. 16 is a diagram showing an example of the automatic traveling of the vehicle 10A during the meeting traveling mode according to the second embodiment. In FIG. 16, a description will be given taking the same surrounding environment of the vehicle 10 as in FIG. 8 as an example. In the automatic travel control process according to the second embodiment, the target travel route RT is not changed in consideration of the existence of a specific person. Therefore, in the example shown in FIG. 16, the target travel route RT1 is continuously used.

In the example of the automatic travel control process shown in FIG. 16, the automatic travel ECU 64 detects at a traveling position P21 that the specific person 9 exists (has entered) within the predetermined distance range R. Accordingly, the automatic travel ECU 64 controls the electric motors 36 (traveling device) so as to increase the vehicle speed V as compared to when the specific person 9 does not exist within the predetermined distance range R.

Specifically, when the specific person 9 does not exist within the predetermined distance range R, basically, the basic target vehicle speed Vtb generated by the automatic travel ECU 64 for realizing the automatic traveling is used as the final target vehicle speed Vt. On the other hand, while the specific person 9 is within the predetermined distance range R, the automatic travel ECU 64 uses a corrected target vehicle speed Vtc, which is higher than this basic target vehicle speed Vtb by a predetermined amount of increase VA, as the final target vehicle speed Vt.

The vehicle 10A performs automatic traveling based on the corrected target vehicle speed Vtc (=Vtb+VA) and the target travel route RT1 until the vehicle 10A reaches a traveling position P22 at which the specific person 9 deviates from the predetermined distance range R. When the vehicle 10A reaches the traveling position P22, the automatic travel ECU 64 returns the target vehicle speed Vt from the corrected target vehicle speed Vtc to the basic target vehicle speed Vtb.

In the example shown in FIG. 16, when detecting that the specific person 6 has entered the predetermined distance range R at the subsequent traveling position P23, the automatic travel ECU 64 again increases the target vehicle speed Vt to the corrected target vehicle speed Vtc. The corrected target vehicle speed Vtc is used until the vehicle 10A reaches a traveling position P24 at which the specific person 6 deviates from the predetermined distance range R.

Hereinafter, similarly, when the specific person 4 enters the predetermined distance range R at a traveling position P25, the automatic travel ECU 64 again increases the target vehicle speed Vt to the corrected target vehicle speed Vtc. The corrected target vehicle speed Vtc is used until the vehicle 10A reaches a traveling position P26 at which the specific person 4 deviates from the predetermined distance range R.

2-2. Process Flow in Operation Management System

Figure 17:
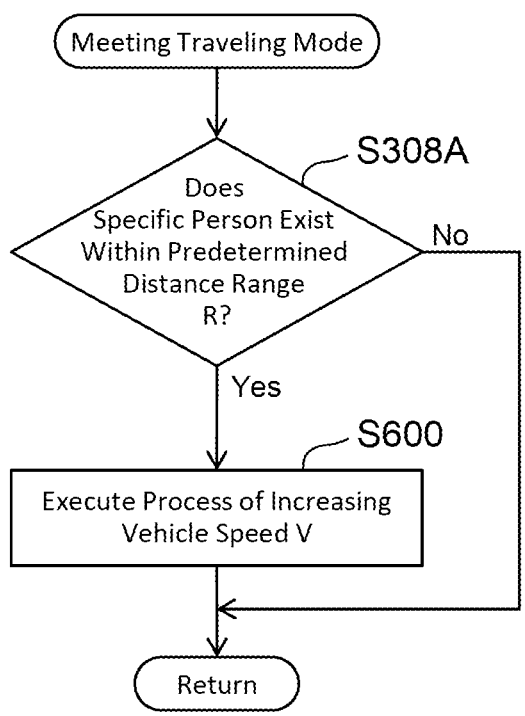
FIG. 17 is a flowchart showing an example of the processing in the meeting traveling mode according to the second embodiment.

FIG. 17 is a flowchart showing an example of the processing in the meeting traveling mode according to the second embodiment. The processing of this flowchart is executed here in combination with the processing by the operation management system 70 shown in FIG. 9 (the example of the mobile meeting service with a destination), but may be executed in combination with the flowchart shown in FIG. 11 or FIG. 12 (Example A or B).

In FIG. 17, if a specific person exists within the predetermined distance range R in step S308A, the processing proceeds to step S600. In step S600, the automatic travel ECU 64 executes the automatic travel control process to increase the vehicle speed V. Specifically, as described with reference to FIG. 16, the automatic travel ECU 64 changes the target vehicle speed Vt from the basic target vehicle speed Vtb to the corrected target vehicle speed Vtc (Vtb+ VA). As an example, a fixed value is used here as the increase amount VA of the vehicle speed V.

2-3. Effect

The higher the vehicle speed V is, the shorter the time traveled in the vicinity of the specific person is, and therefore, the conversation becomes difficult to hear. According to the second embodiment described so far, when a specific person is present within the predetermined distance range R from the vehicle 10, the automatic travel control of the vehicle 10 is executed so as to increase the vehicle speed V. Even by this kind of method according to the second embodiment, it is possible to make it difficult for a person outside the vehicle 10 to hear the conversations in the riding space 11.

2-4. Other Examples of Automatic Travel Control Process

Figure 18:
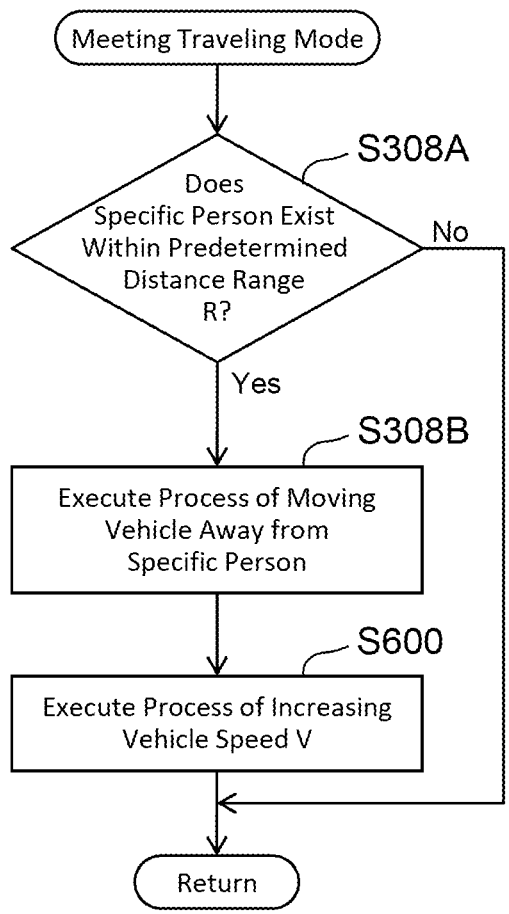
FIG. 18 is a flowchart showing another example of the processing in the meeting traveling mode according to the second embodiment.

FIG. 18 is a flowchart showing another example of the processing in the meeting traveling mode according to the second embodiment. In this flowchart, when a specific person exists within the predetermined distance range R in step S308A, the automatic travel ECU 64 executes both the process of moving the vehicle 10 away from the specific person (step S308B) and the process of increasing the vehicle speed V (step S600). This makes it possible to more effectively make conversations in the riding space 11 less likely to be heard by people outside the vehicle 10.

Figure 19:
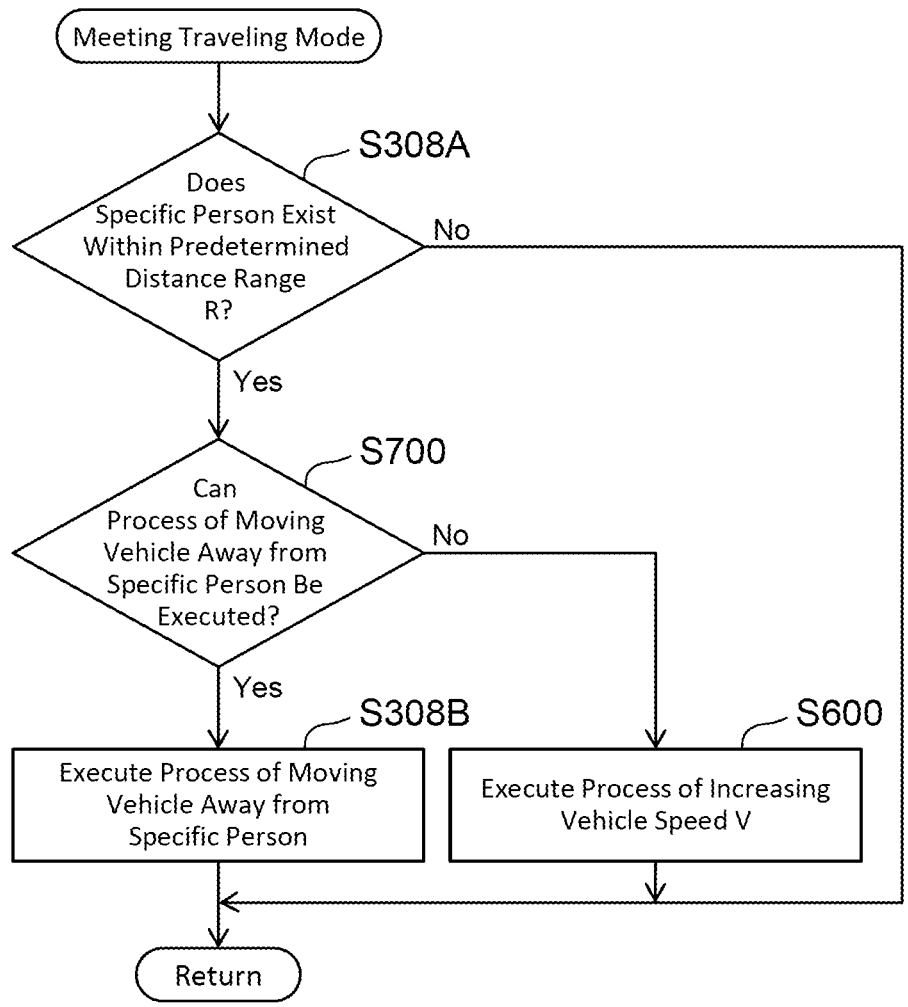
FIG. 19 is a flowchart showing still another example of the processing in the meeting traveling mode according to the second embodiment.

FIG. 19 is a flowchart showing still another example of the processing in the meeting traveling mode according to the second embodiment. In this flowchart, when a specific person exists within the predetermined distance range R in step S308A, the processing proceeds to step S700.

In step S700, the automatic travel ECU 64 determines whether or not the process of moving the vehicle 10 away from the specific person (step S308B) can be executed. Specifically, for example, when there are many specific persons around the vehicle 10 due to traffic congestion, it may happen that the target travel route RT cannot be changed in order to move the vehicle 10 away from one or more specific persons to be avoided. In this S700, it is determined whether or not the target travel route RT can be changed.

When the determination result of step S700 is positive, the automatic travel ECU 64 executes a process of moving the vehicle 10 away from the specific person in step S308B. On the other hand, when the determination result is negative (that is, when the traveling device (the electric motors 36) cannot be controlled so as to move the open vehicle 10 away from the specific person), the automatic travel ECU 64 executes the process of increasing the vehicle speed V in step S600.

According to the example shown in FIG. 19 described above, the automatic travel control can be constructed as follows. That is, basically, the processing of step S308B can be executed with priority over the processing of the step S600. Then, even if the processing of step S308B cannot be performed, it is possible to take measures with the processing of step S600 to make it difficult for people outside the vehicle 10 to hear the conversation in the riding space 11. Therefore, this example is suitable for use in an environment in which measures to move the vehicle 10 away from a specific person are more desirable than measures to increase the vehicle speed V.

2-5. Other Setting Examples of Increase Amount VA of Vehicle Speed V

In step S600 described above (see FIG. 17), the increase amount VA of the vehicle speed V is a fixed value. However, instead of this kind of example, the increase amount VA may be changed as follows in accordance with, for example, at least one of the voice volume VV of conversation of a plurality of users in the riding space 11 and the confidentiality level LV of conversation of the plurality of users in the riding space 11.

Figure 20:
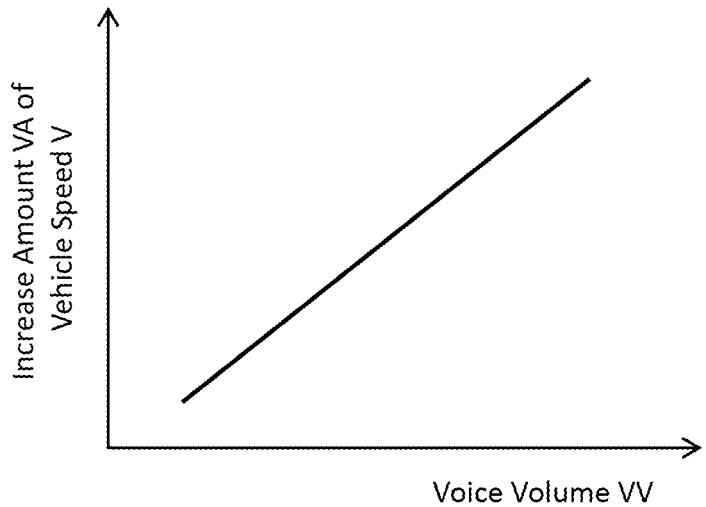
FIG. 20 is a graph showing an example of the relation between an increase amount VA of the vehicle speed V and the voice volume VV.

FIG. 20 is a graph showing an example of the relation between the increase amount VA of the vehicle speed V and the voice volume VV. In this example, the increase amount VA is set to be greater when the voice volume VV is large than when the voice volume VV is small. As a result, when the voice volume VV is large, the vehicle speed V during execution of the automatic travel control process becomes higher than when the voice volume VV is small. Therefore, the vehicle speed V for making it difficult to hear the conversation can be appropriately set in accordance with the voice volume VV.

It should be noted that the increase amount VA may be increased continuously (e.g., linearly) as the voice volume VV increases as in the example shown in FIG. 20, or may be increased in a stepwise fashion as the voice volume VV increases. This also applies to the following setting example shown in FIG. 21.

Figure 21:
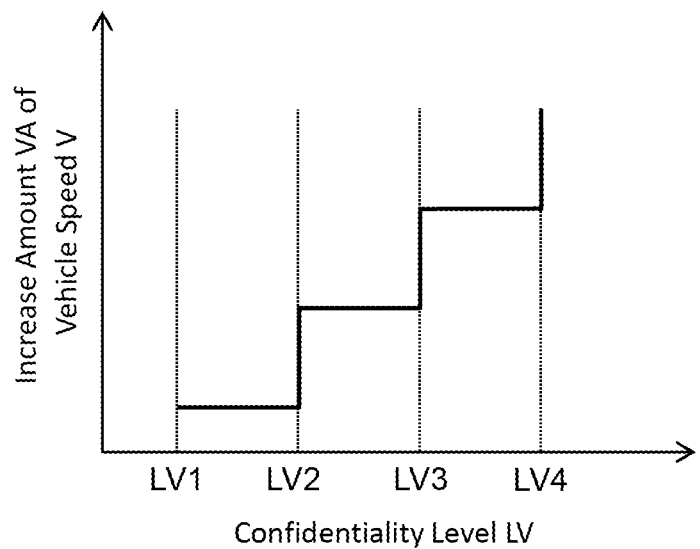
FIG. 21 is a graph showing an example of the relation between the increase amount VA of the vehicle speed V and the confidentiality level LV of the conversation.

FIG. 21 is a graph showing an example of the relation between the increase amount VA of the vehicle speed V and the confidentiality level LV of the conversation. In this example, when the confidentiality level LV is high, the increase amount VA is set to be larger than when the confidentiality level LV is low. As a result, the vehicle speed V for making it difficult to hear the conversation can be appropriately set in accordance with the confidentiality level LV. In FIG. 21, as examples, the increase amount VA is changed in a stepwise fashion in accordance with four confidentiality levels LV1 to LV4.

3. Third Embodiment

In a third embodiment, an additional measure using the speaker 26 (see FIG. 1) to make it difficult for a specific person to hear the conversation on the vehicle 10 will be described. In the following description, this measure is combined with the first embodiment, but may be combined with the second embodiment.

3-1. Additional Measure Using Speaker

Specifically, in the third embodiment, when a specific person exists within the predetermined distance range R, the automatic travel ECU 64 operates the speaker 26 together with the control of the electric motors 36 for moving the vehicle 10 away from the specific person. As described above, the speaker 26 is installed on the vehicle 10 so as to emit sound toward the unshielded outside space OS from the riding space 11.

The speaker 26 generates, for example, a sound having a sound masking effect. Examples of the sound having this kind of effect include a noise sound, a sound in a frequency band equivalent to the voice during conversation, a sound that imitates the traveling noise of a car, such as engine sound, and a natural sound such as the babbling of a stream or the chirping a wild bird. Such sound data is stored as a sound database in the storage device 64b of the automatic travel ECU 64. The processor 64a outputs the sound data called from the sound database to the speaker 26 via an amplifier (not shown) including a D/A converter. It should be noted that the process related to the operation of the speaker 26 in the third embodiment may be performed by, for example, a dedicated ECU instead of the automatic travel ECU 64.

Figure 22:
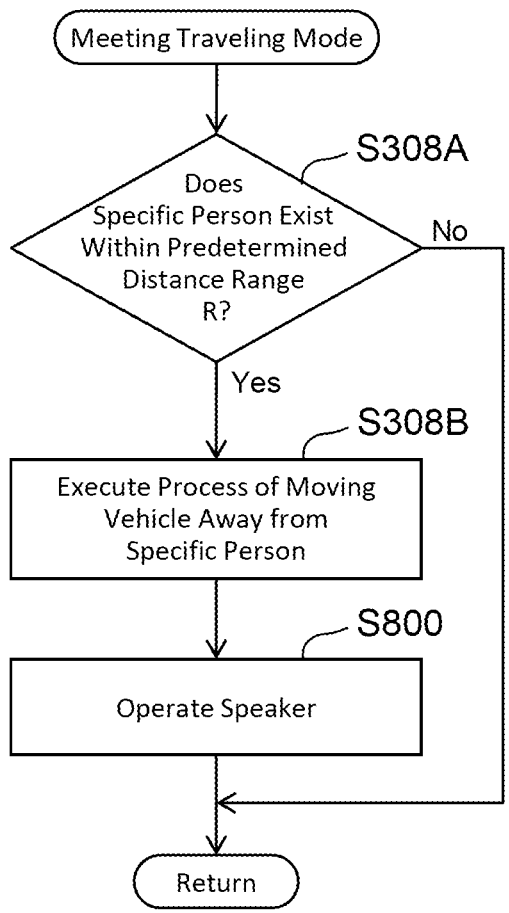
FIG. 22 is a flowchart showing the processing in a meeting traveling mode according to a third embodiment.

FIG. 22 is a flowchart showing the processing in the meeting traveling mode according to the third embodiment. In FIG. 22, when a specific person exists within the predetermined distance range R in step S308A, the automatic travel ECU 64 executes the processing of step S800 for operating the speaker 26 together with the processing of step S308B.

It should be noted that, when the additional measure using the speaker 26 is combined with the second embodiment, the processing of step S600 (see FIG. 17) is executed instead of the processing of step S308B. Also, the processing of step S800 according to the third embodiment may be incorporated in any one of other flowcharts shown in FIG. 11 (Example A), FIG. 12 (Example B), FIG. 18, and FIG. 19.

3-2. Effect

According to the third embodiment described so far, the sound is generated in the surroundings by using the speaker 26 together with the execution of the automatic travel control process of the first embodiment. As a result, it is possible to more reliably make it more difficult for the specific person in the surroundings to hear the conversation.

4. Fourth Embodiment

A fourth embodiment is different from the first embodiment in that the automatic travel control process includes the following additional process.

4-1. Outline of Automatic Travel Control Process

As described in the first embodiment, "specific person" includes a specific person who is moving (e.g., a pedestrian and a specific person riding an open vehicle). Even if a moving specific person exists within the predetermined distance range R, when the relative speed ΔV of the vehicle 10 with respect to the specific person is high, the time spent traveling in the vicinity of the specific person is shortened, which makes it difficult to hear the conversation.

In view of the above, in the fourth embodiment, the automatic travel ECU 64 is configured such that, when the relative speed ΔV is higher than a predetermined threshold value TH even if a specific person exists within the predetermined distance range R, the process of moving the vehicle 10 away from the specific person is not performed.

Figure 23:
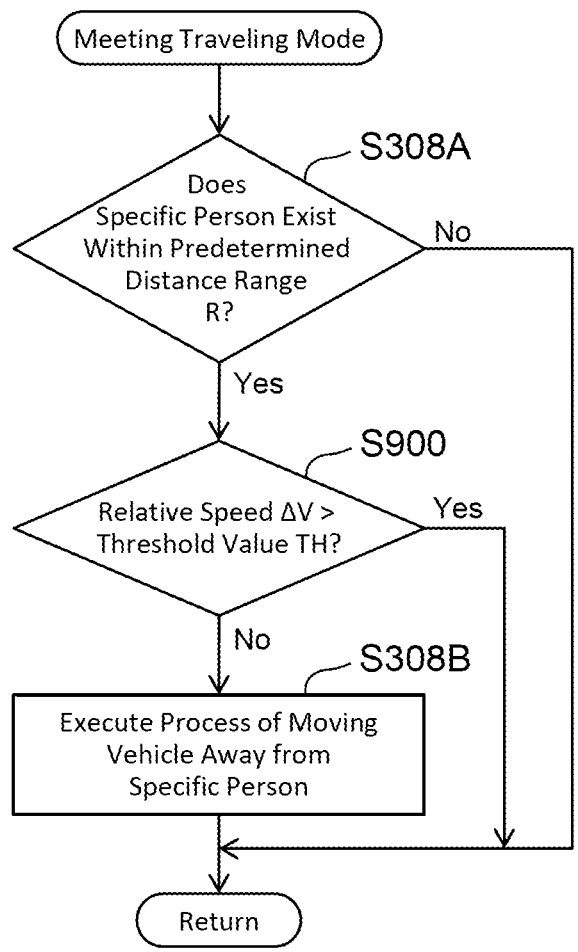
FIG. 23 is a flowchart showing an example of the processing in a meeting traveling mode according to a fourth embodiment.

FIG. 23 is a flowchart showing an example of the processing in the meeting traveling mode according to the fourth embodiment. In FIG. 23, when a specific person exists within the predetermined distance range R in step S308A, the processing proceeds to step S900.

In step S900, the automatic travel ECU 64 determines whether or not the relative speed ΔV of the vehicle 10 with respect to the specific person recognized in step S308A is higher than the threshold TH described above. The relative speed ΔV can be obtained, for example, by time-differentiating the distance between the specific person and the vehicle 10 measured by the LIDAR 58. The threshold value TH is determined in advance by, for example, an experiment as a lower limit value of the relative speed ΔV in which a specific person cannot hear a conversation.

When the relative speed ΔV is equal to or lower than the threshold value TH in step S900, the automatic travel ECU 64 executes the process of moving the vehicle 10 away from the specific person in step S308B. On the other hand, when the relative speed ΔV is higher than the threshold value TH, the automatic travel ECU 64 immediately ends the current processing cycle (i.e., does not execute the process of moving the vehicle 10 away from the specific person).

4-2. Effect

According to the fourth embodiment described so far, the process of moving the vehicle 10 away from the specific person can be performed when this process is really necessary.

4-3. Other Examples of Automatic Travel Control Process

Figure 24:
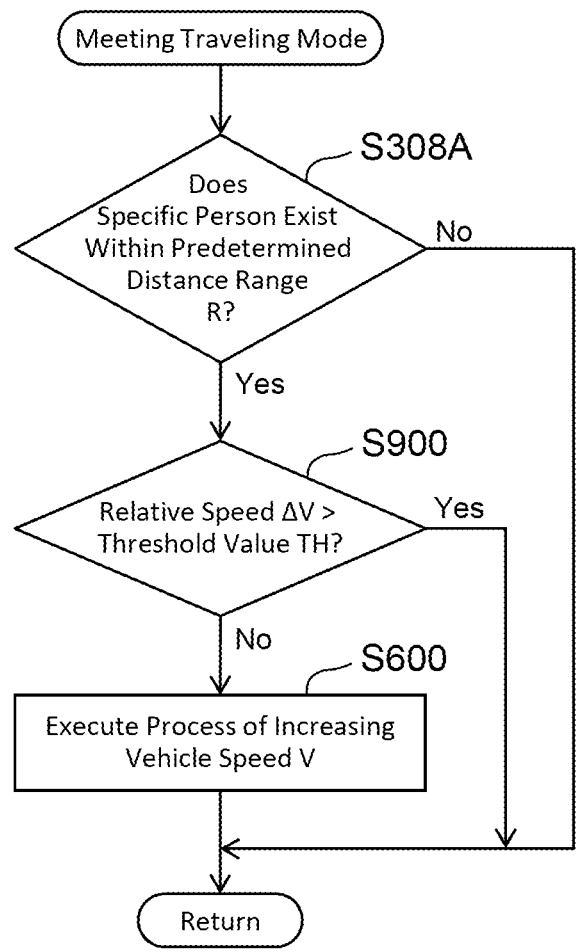
FIG. 24 is a flowchart showing another example of the processing in the meeting traveling mode according to the fourth embodiment.

FIG. 24 is a flowchart showing another example of the processing in the meeting traveling mode according to the fourth embodiment. In FIG. 24, when a specific person exists within the predetermined distance range R (step S308A; Yes) and the relative speed ΔV is equal to or lower than the threshold value TH (step S900; No), the automatic travel ECU 64 executes the process of increasing the vehicle speed V (step S600). On the other hand, when the relative speed ΔV is higher than the threshold value TH (step S900; Yes), the automatic travel ECU 64 immediately ends the current processing cycle (i.e., does not execute the process of increasing the vehicle speed V). As a result, the process of increasing the vehicle speed V can be performed when this process is really necessary. This also leads to a reduction in the power consumption of the power supply 52.

Furthermore, the processing of step S900 in which the relative speed ΔV is considered for executing the automatic travel control process may be incorporated in the example shown in FIG. 18 in which both the process of moving the vehicle 10 away from a specific person and the process of increasing the vehicle speed V are performed.

5. Other Embodiments

The first to fourth embodiments described above are directed to the vehicle dispatch service (mobile meeting service) accompanied by the meeting traveling mode. However, the mobile meeting service may be provided without the vehicle dispatch service. Specifically, for example, a plurality of users who desire to ride approaches the vehicle 10 traveling around the users. As a result, the vehicle 10 detects the users and stops. One of the users uses the mobile terminal 3 to perform a predetermined process required to ride, and then boards the vehicle 10. Alternatively, the mobile meeting service may be provided without using the management server by using a riding method in which a plurality of users go to a predetermined stop and boards the vehicle 10 waiting there. It should be noted that in these examples of the mobile meeting service, the user operates the mobile terminal 3 or the input device 22 to transmit the mobile meeting request to the vehicle 10 when riding, for example.

Furthermore, the "specific person recognition process" and the "automatic travel control process" according to the present disclosure are not necessarily limited to those executed as the meeting traveling mode in response to a mobile meeting request. That is, the "open vehicle" according to the present disclosure may be configured as a vehicle that voluntarily executes these "specific person recognition process" and "automatic travel control process" without the process of accepting the mobile meeting request.

What is claimed is:

1. An open vehicle having a riding space that is not shielded from an outside, the open vehicle comprising:
   a vehicle upper portion having a riding surface that forms a bottom surface of the riding space and is configured for a plurality of users to ride on;
   a traveling device including at least a power unit and configured to drive and turn the open vehicle;
   one or more external sensors configured to recognize a surrounding environment of the open vehicle; and
   one or more electronic control units configured to control the traveling device to cause the open vehicle to automatically travel, wherein
   the one or more electronic control units are configured to execute:
   a specific person recognition process to use the one or more external sensors to recognize a specific person being a person existing in an outside space that is not shielded from the riding space; and
   an automatic travel control process to control the traveling device such that, when the specific person exists within a range of a predetermined distance from the open vehicle, the traveling device executes of moving the open vehicle away from the specific person and executes increasing a vehicle speed being a speed of the open vehicle as compared to when the specific person does not exist within the range.

2. The open vehicle according to claim 1, wherein
   the one or more electronic control units are configured to receive a destination of the open vehicle and a mobile meeting request for the plurality of users to hold a mobile meeting on the open vehicle, and then execute a meeting traveling mode until the open vehicle reaches the destination, and the specific person recognition process and the automatic travel control process are executed in the meeting traveling mode.

3. The open vehicle according to claim 1, wherein
the one or more electronic control units are configured to receive a mobile meeting request for a plurality of users to hold a mobile meeting on the open vehicle and a scheduled time for the mobile meeting, and then execute a meeting traveling mode without a destination until the scheduled time elapses, and the specific person recognition process and the automatic travel control process are executed in the meeting traveling mode.

4. The open vehicle according to claim 3, wherein
after the scheduled time elapses, the one or more electronic control units are configured to execute a return mode that controls the traveling device such that the open vehicle returns to a starting location of the meeting traveling mode.

5. The open vehicle according to claim 1, wherein
in the automatic travel control process, the one or more electronic control units are configured to lengthen the predetermined distance when the vehicle speed is low than when the vehicle speed is high.

6. The open vehicle according to claim 1, further comprising a microphone, wherein
in the automatic travel control process, the one or more electronic control units are configured to lengthen the predetermined distance when a voice volume of conversation of the plurality of users in the riding space is large than when the voice volume is small.

7. The open vehicle according to claim 1, further comprising a microphone, wherein
in the automatic travel control process, the one or more electronic control units are configured to increase the vehicle speed when a voice volume of conversation of the plurality of users in the riding space is large than when the voice volume is small.

8. The open vehicle according to claim 1, wherein
in the automatic travel control process, the one or more electronic control units are configured to receive information indicating a confidentiality level of conversation of the plurality of users in the riding space and lengthen the predetermined distance when the confidentiality level is high than when the confidentiality level is low.

9. The open vehicle according to claim 1, wherein
in the automatic travel control process, the one or more electronic control units are configured to receive information indicating a confidentiality level of conversation of the plurality of users in the riding space and increase the vehicle speed when the confidentiality level is high than when the confidentiality level is low.

10. The open vehicle according to claim 1, wherein
in the automatic travel control process, the one or more electronic control units are configured to increase the vehicle speed when the traveling device cannot be controlled so as to move the open vehicle away from the specific person as compared to when the specific person does not exist within the range.

11. The open vehicle according to claim 1, further comprising a speaker configured to emit sound toward the outside space, wherein the one or more electronic control units are configured to operate the speaker when the specific person exists within the range.

12. The open vehicle according to claim 1, wherein
in the automatic travel control process, the one or more electronic control units are configured not to execute at least one of moving the open vehicle away from the specific person and increasing the vehicle speed when a relative speed of the open vehicle with respect to the specific person is higher than a threshold value.

13. An operation management system, comprising:
at least one open vehicle according to claim 1;
a mobile terminal owned by at least one of the plurality of users; and
a management server including a processor and configured to communicate with the at least one open vehicle and the mobile terminal via a wireless communication network, wherein the processor is programmed to receive, from the mobile terminal, vehicle dispatch reservation information including at least a dispatch location of the open vehicle, and dispatch the open vehicle to a received dispatch location.

14. An open vehicle having a riding space that is not shielded from an outside, the open vehicle comprising:
a vehicle upper portion having a riding surface that forms a bottom surface of the riding space and is configured for a plurality of users to ride on;
a traveling device including at least a power unit and configured to drive and turn the open vehicle;
one or more external sensors configured to recognize a surrounding environment of the open vehicle; and
one or more electronic control units configured to control the traveling device to cause the open vehicle to automatically travel, wherein the one or more electronic control units are configured to:
execute a specific person recognition process to use the one or more external sensors to recognize a specific person being a person existing in an outside space that is not shielded from the riding space;
execute an automatic travel control process to control the traveling device such that, when the specific person exists within a range of a predetermined distance from the open vehicle, the traveling device executes at least one of moving the open vehicle away from the specific person and increasing a vehicle speed being a speed of the open vehicle as compared to when the specific person does not exist within the range; and
receive a destination of the open vehicle and a mobile meeting request for the plurality of users to hold a mobile meeting on the open vehicle, and then execute a meeting traveling mode until the open vehicle reaches the destination, and wherein the specific person recognition process and the automatic travel control process are executed in the meeting traveling mode.

15. An open vehicle having a riding space that is not shielded from an outside, the open vehicle comprising:
a vehicle upper portion having a riding surface that forms a bottom surface of the riding space and is configured for a plurality of users to ride on;
a traveling device including at least a power unit and configured to drive and turn the open vehicle;
one or more external sensors configured to recognize a surrounding environment of the open vehicle; and one or more electronic control units configured to control the traveling device to cause the open vehicle to automatically travel, wherein the one or more electronic control units are configured to:

execute a specific person recognition process to use the one or more external sensors to recognize a specific person being a person existing in an outside space that is not shielded from the riding space;

execute an automatic travel control process to control the traveling device such that, when the specific person exists within a range of a predetermined distance from the open vehicle, the traveling device executes at least one of moving the open vehicle away from the specific person and increasing a vehicle speed being a speed of the open vehicle as compared to when the specific person does not exist within the range; and receive a mobile meeting request for a plurality of users to hold a mobile meeting on the open vehicle and a scheduled time for the mobile meeting, and then execute a meeting traveling mode without a destination until the scheduled time elapses, and wherein the specific person recognition process and the automatic travel control process are executed in the meeting traveling mode.

16. The open vehicle according to claim 15, wherein after the scheduled time elapses, the one or more electronic control units are configured to execute a return mode that controls the traveling device such that the open vehicle returns to a starting location of the meeting traveling mode.

* * * * *